(12) United States Patent
Lai

(10) Patent No.: US 12,093,250 B2
(45) Date of Patent: *Sep. 17, 2024

(54) PROCESSING NATURAL LANGUAGE QUESTIONS BASED ON DATA STORED ACROSS HETEROGENEOUS DATA SOURCES

(71) Applicant: Promethium, Inc., Menlo Park, CA (US)

(72) Inventor: Kaycee Lai, San Carlos, CA (US)

(73) Assignee: PROMETHIUM, INC., Menlo Park, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/171,635

(22) Filed: Feb. 20, 2023

(65) Prior Publication Data

US 2023/0350885 A1 Nov. 2, 2023

Related U.S. Application Data

(63) Continuation of application No. 16/824,706, filed on Mar. 20, 2020, now Pat. No. 11,609,903.

(Continued)

(51) Int. Cl.
*G06F 17/00* (2019.01)
*G06F 16/242* (2019.01)
*G06F 16/2452* (2019.01)
*G06F 16/2455* (2019.01)
*G06F 16/2457* (2019.01)
(Continued)

(52) U.S. Cl.
CPC ...... *G06F 16/243* (2019.01); *G06F 16/24522* (2019.01); *G06F 16/24558* (2019.01); *G06F 16/24573* (2019.01); *G06F 16/24578* (2019.01); *G06F 16/256* (2019.01); *G06F 16/28* (2019.01); *G06F 16/288* (2019.01); *G06F 40/20* (2020.01);
(Continued)

(58) Field of Classification Search
None
See application file for complete search history.

(56) References Cited

U.S. PATENT DOCUMENTS 5,933,822 A 8/1999 Braden-Harder et al.
5,953,716 A 9/1999 Madnick et al.
(Continued)

OTHER PUBLICATIONS

Extended European Search Report, European Patent Office Application No. EP 20771965.9, Jan. 30, 2023.
(Continued)

*Primary Examiner* — Satwant K Singh
(74) *Attorney, Agent, or Firm* — FENWICK & WEST LLP

(57) ABSTRACT

An analysis system connects to a set of data sources and perform natural language questions based on the data sources. The analysis system connects with the data sources and retrieves metadata describing data assets stored in each data source. The analysis system generates an execution plan for the natural language question. The analysis system finds data assets that match the received question based on the metadata. The analysis system ranks the data assets and presents the ranked data assets to users for allowing users to modify the execution plan. The analysis system may use execution plans of previously stored questions for executing new questions. The analysis system supports selective preprocessing of data to increase the data quality.

20 Claims, 15 Drawing Sheets

Related U.S. Application Data

(60) Provisional application No. 62/901,196, filed on Sep. 16, 2019, provisional application No. 62/821,326, filed on Mar. 20, 2019.

(51) Int. Cl.
  *G06F 16/25* (2019.01)
  *G06F 16/28* (2019.01)
  *G06F 40/20* (2020.01)
  *G06F 40/295* (2020.01)
  *G06F 40/30* (2020.01)
  *G06F 40/56* (2020.01)

(52) U.S. Cl.
  CPC ............ *G06F 40/295* (2020.01); *G06F 40/30* (2020.01); *G06F 40/56* (2020.01)

(56) References Cited

U.S. PATENT DOCUMENTS

| | | | |
|---|---|---|---|
| 6,466,931 | B1 | 10/2002 | Attaluri et al. |
| 9,244,971 | B1 | 1/2016 | Kalki |
| 9,367,608 | B1 | 6/2016 | Zhang |
| 9,501,585 | B1 | 11/2016 | Gautam et al. |
| 10,255,273 | B2 * | 4/2019 | Chakraborty ....... G06F 16/3344 |
| 10,572,598 | B2 * | 2/2020 | Chakraborty .......... G06N 3/044 |
| 11,360,969 | B2 * | 6/2022 | Lai .................... G06F 16/24524 |
| 11,609,903 | B2 * | 3/2023 | Lai ......................... G06F 16/256 |
| 2004/0083205 | A1 | 4/2004 | Yeager |
| 2004/0158551 | A1 | 8/2004 | Santosuosso |
| 2005/0080771 | A1 | 4/2005 | Fish |
| 2005/0256848 | A1 | 11/2005 | Alpert et al. |
| 2011/0093257 | A1 | 4/2011 | Shpigel et al. |
| 2011/0106746 | A1 | 5/2011 | Ventilla et al. |
| 2012/0005190 | A1 | 1/2012 | Faeber et al. |
| 2012/0130986 | A1 | 5/2012 | Abdellatif et al. |
| 2013/0262501 | A1 | 10/2013 | Kuchmann-Beauger et al. |
| 2013/0268527 | A1 | 10/2013 | Block |
| 2014/0019443 | A1 | 1/2014 | Golshan |
| 2014/0358890 | A1 | 12/2014 | Chen et al. |
| 2015/0149182 | A1 | 5/2015 | Kalns et al. |
| 2015/0324422 | A1 | 11/2015 | Elder |
| 2015/0324908 | A1 | 11/2015 | Starikova et al. |
| 2015/0347507 | A1 | 12/2015 | Annapragada et al. |
| 2016/0098387 | A1 | 4/2016 | Bruno et al. |
| 2016/0098389 | A1 | 4/2016 | Bruno et al. |
| 2016/0098394 | A1 | 4/2016 | Bruno et al. |
| 2017/0017689 | A1 | 1/2017 | Scheibli et al. |
| 2017/0060831 | A1 | 3/2017 | Smythe et al. |
| 2018/0137249 | A1 | 5/2018 | Eggebraaten et al. |
| 2019/0065499 | A1 | 2/2019 | Wagstaff et al. |
| 2019/0079978 | A1 | 3/2019 | Ali et al. |
| 2019/0095499 | A1 | 3/2019 | Payne et al. |
| 2019/0138660 | A1 | 5/2019 | White et al. |
| 2019/0340240 | A1 | 11/2019 | Duta |
| 2019/0392066 | A1 * | 12/2019 | Kim .................. G06F 16/24578 |
| 2020/0034362 | A1 | 1/2020 | Galitsky |
| 2020/0159848 | A1 | 5/2020 | Yeo |
| 2020/0301913 | A1 | 9/2020 | Lai |
| 2020/0301931 | A1 | 9/2020 | Lai |
| 2020/0341954 | A1 | 10/2020 | Chetia et al. |
| 2020/0356604 | A1 | 11/2020 | MacDougall |
| 2021/0093734 | A1 | 4/2021 | Wilson et al. |

OTHER PUBLICATIONS

International Preliminary Examination Report (IPRP Chapter II), Patent Cooperation Treaty Application No. PCT/US2020/024003, Apr. 20, 2021, sixteen pages.

International Search Report and Written Opinion, Patent Cooperation Treaty Application No. PCT/US2020/024003, Jul. 29, 2020, 18 pages.

United Stated Office Action, U.S. Appl. No. 16/824,458, filed Mar. 15, 2021, 12 pages.

United Stated Office Action, U.S. Appl. No. 16/824,458, filed Sep. 20, 2021, 13 pages.

United Stated Office Action, U.S. Appl. No. 16/824,803, filed Sep. 14, 2021, 16 pages.

Zahir and El Qadi, "A Recommendation System for Execution Plans Using Machine Learning," Mathematical and Computational Applications, 2016, 21(2), 23, pp. 1-13.

Zhao and Sudha, "Entity matching across heterogeneous data sources: An approach based on constrained cascade generalization," Data & Knowledge Engineering, vol. 66, Issue 3, Sep. 2008, pp. 368-381.

United Stated Office Action, U.S. Appl. No. 16/824,706, filed Mar. 17, 2022, 17 pages.

United Stated Office Action, U.S. Appl. No. 16/824,706, filed Sep. 16, 2022, 11 pages.

\* cited by examiner

Dashboard  Context  Data Explorer  PROMETHIUM

| | PM61 CloudFile_kaycee<br>Type: Cloud  January 15, 2020 9:40 PM | PM61 CloudFile_pharma<br>Type: Cloud  January 6, 2020 9:31 AM | PM61 CloudFile_s3new001<br>Type: Cloud  January 5, 2020 11:35 AM |
|---|---|---|---|
| + | Contextualized  0%<br>Connect | Contextualized  100%<br>Connect | Contextualized  100%<br>Connect |
| pm61 mysqlantonio<br>Type: MySQL  February 8, 2020 7:02 PM | PM61 CloudFile_userdata<br>Type: Cloud  January 3, 2020 9:47 PM | pm61 teradata<br>Type: Teradata  Dec 20, 2019 9:56 AM | pm61hive<br>Type: Hive  January 7, 2020 1:28 PM |
| Contextualized  100%<br>Connect | Contextualized  100%<br>Connect | Contextualized  100%<br>Connect | Contextualized  100%<br>Connect |
| cracleantonio<br>Type: Oracle  February 8, 2020 7:56 PM | pm61mysqltoy<br>Type: MySQL  Dec 13, 20190 10:07 AM | pm61 oracledev<br>Type: Oracle  Nov 21, 2019 6:04 PM | pm61oracle<br>Type: Oracle  Dec 20, 2019 12:42 PM |
| Contextualized  100%<br>Connect | Contextualized  100%<br>Connect | Contextualized  100%<br>Connect | Contextualized  100%<br>Connect |

Previous  1  2  Next  11 / page

✳ Dashboard ▫ Context ▫ Data Explorer     PROMETHIUM     ⓘ▽ ⟳▽ 🔊

Explore And Search

[ product| ]    ( search )

Search results: 26

Associated Questions for table products ✕ — 318

1. Did the customer with the most recent transaction live in the same country as their transaction?
2. Do shares have the highest number of transactions out of all products?
3. When was the transaction with the highest amount done?
4. How many transactions have been conducted with customers from the United States?
5. What is the status for each order?
6. What is the total products sold this year?
7. Which products were returned the most?
8. How many products had promotions?
9. How many products that had promotions were paid for in cash?

[ Cancel ] [ OK ]

| Name ⇔ | Columns | Associat... | | | Location ⇔ | |
|---|---|---|---|---|---|---|
| product_dimension | | | | | toymysql-v2sandbox2.crkcnhskg2e6.us-e... | |
| product_dimension | | | | | toymysql-pm61dev.c1mind517jhj.us-west... | |
| WELL_PRODUCTION | | | | | toyoracle-v2sandbox1.crkcnhskg2e6.us-e... | |
| PRODUCT_DIMENSION | | | | | toyoracle-pm61dev.c1mind517jhj.us-west... | |
| products | | n/a | Oracle | pm61mysql | table | toymysql-pm61dev.c1mind517jhj.us-west... |
| products | | n/a | Hive | pm61hive | table | toymysql-v2sandbox2.crkcnhskg2e6.us-e... |
| WELL_PRODUCTION_COST | | | | | 10.201.1.47:10000 | |
| product_source | | | MySQL | pm61mysqlantonio | table | toymysql-v2sandbox1.crkcnhskg2e6.us-e... |
| products | | | Oracle | oracleantonio | table | toymysql-v2sandbox2.crkcnhskg2e6.us-e... |
| PRODUCT_DIMENSION | | | | | toymysql-v2sandbox1.crkcnhskg2e6.us-e... | |

< 1 2 3 >   10 / page ∨

*FIG. 3D*

PROCESSING NATURAL LANGUAGE QUESTIONS BASED ON DATA STORED ACROSS HETEROGENEOUS DATA SOURCES

CROSS-REFERENCES TO RELATED APPLICATIONS

This application is a continuation of U.S. application Ser. No. 16/824,706, filed on Mar. 20, 2020, which claims the benefits of U.S. Provisional Application No. 62/901,196, filed on Sep. 16, 2019 and U.S. Provisional Application No. 62/821,326, filed on Mar. 20, 2019, each of which is incorporated by reference in its entirety.

FIELD OF INVENTION

This disclosure concerns analysis of data stored across heterogenous data sources in general and more specifically to ranking of data assets across heterogeneous data sources for answering natural language questions.

BACKGROUND

Organizations store data in multiple data sources, for example, relational databases, file systems, cloud storage, and so on. Furthermore, each type of data source may have multiple instances. Each instance of a data source may be provided by a different vendor. For example, the same organization may store some data in an ORACLE database and some data in SQLSERVER database. Each data source can be a complex system that requires an expert who can interact with the system.

Due to these complexities, any analysis of the data stored by the organization becomes a complex project. This project may involve several stages including (1) data discovery to identify what data is available in each data source, (2) data import process to ingest data and move it to a storage system for analysis, (3) determination of the subset of data that is of interest, and (4) analysis by running queries and reviewing results for validation. Each stage can take weeks or months depending on the complexity of the data stored. As a result, the organization may take several weeks or months before any visibility is gained into the data stored. Furthermore, at the end of the process, a determination may be made that the data that was necessary to answer certain questions was not available. Accordingly, the process may have to be repeated to do further analysis of the data or to analyze the data for other possible questions that may be of interest or to analyze different subset of the data. This multiplies the entire delay by a factor depending on the number of times the process needs to be repeated.

Furthermore, this process is made more difficult since the users with high-level domain knowledge typically do not have the technical expertise to interact with the systems storing the data and the users that have expertise to interact with the systems typically lack high-level domain expertise. As a result, there is a knowledge gap between the two types of users that are interacting. For example, the lack of domain knowledge may cause the technical user to look for incorrect information and return a negative answer even if the requested information as available. As a result, the domain experts are often unable to exploit the information available in the data sources to the maximum extent possible.

SUMMARY

An analysis system allows users to connect to a set of data sources and perform queries across the data sources. The data sources may be of different types, for example, a data source may be a relational database system and another data source may be a file system. The analysis system connects with the data sources and retrieves metadata describing data assets stored in each data source. For example, for a relational database system, the data assets may represent tables and for a file system, the data assets may be files. The analysis system receives a natural language question and generates execution plans for executing them.

The analysis system receives a natural language question and identifies phrases in the question. A phrase may comprise one or more keywords. The analysis system performs the following processing for each phrase. The analysis system identifies a plurality of data assets matching the phrase from the plurality of data sources. Each data asset is determined to store data relevant for answering the question and is associated with the phrase. For example, in an embodiment, the analysis system generates a virtual data model comprising entities and relationships between entities. The analysis system associated a phrase with an entity and identifies data assets that match the entity. The analysis system determines a score for each data asset matching a phrase. The analysis system determines the score based on factors comprising, a degree of match between the phrase and metadata describing the data asset. The analysis system ranks the plurality of data assets based on their scores and determines a subset of data assets based on the ranking. The analysis system sends the subset of data assets for display via a client device.

The analysis system may determine the score for a data asset based on other factors. For example, each data asset may be associated with a set of questions previously received and the analysis system determines the score for the data asset based on the number of distinct stored questions for the data asset.

In an embodiment, the score for A data asset is determined based on a weighted aggregate of the stored questions for the data asset. each stored question is weighted based on a number of times the stored question was invoked.

In an embodiment, the analysis system receives selections of a data assets for one or more phrases. The analysis system generates instructions, for example, step by step directions describing how the data required for processing the question will be accessed for the selected data assets from the data sources and processed. The instructions may comprise instructions to extract data of the selected data assets from the data sources, instructions to transform data to match formats across data sources, instructions to combine (e.g., join) data from different data sources, and so on. In some embodiments, the analysis system publishes the instructions, for example, by sending the instructions via an email to a system administrator or by displaying the instructions via a user interface. In another embodiment, the analysis system generates executable instructions, for example, SQL (structured query language) instructions. The analysis system receives a request to execute the instructions and executes them using an execution engine to generate results based on the received question.

Embodiments of a computer readable storage medium store instructions for performing the steps of the above methods. Embodiments of the computer system comprise one or more computer processors and a computer readable storage medium that stores instructions for performing the steps of the above methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3A shows a user interface presenting a comprehensive view of all data sources available in a system environment, according to an embodiment.

FIG. 3B shows a user interface for allowing a user to select specific data assets to be processed in a data source, according to an embodiment.

FIG. 3D shows the user interface for presenting associated questions for a search result, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Conventional techniques require users to extract data from multiple sources to analyze and determine whether the data serves a specified purpose, for example, whether it answers a given question. Conventional systems perform ETL (extract, transform, and load) process to extract all data from each data source to be able to join the data. Following steps are typically performed for answering a question based on data stored across a plurality of heterogeneous data sources: (1) Ask user to identify each data source. (2) Perform ETL (extract transform load) job to move all data from the data source. (3) Receive from users, a filter and determine a subset of the data obtained from each data source. (4) Receive from users, a query to join the subset of data from each data source. (5) Generate a table storing the join result. (6) Execute the query using the table, for example, using a BI (business intelligence) tool.

Embodiments of the analysis system allows users to ask questions without requiring them to have technical knowledge of the underlying data sources. Embodiments of the invention eliminate the need to perform the ETL process. Accordingly, the analysis system automatically performs several steps of the above process, for example, steps 1, 2, and 4. The analysis system automatically determines (1) what data needs to be processed, (2) where that data is present, and (3) how the data should be extracted and combined.

Figure 1:
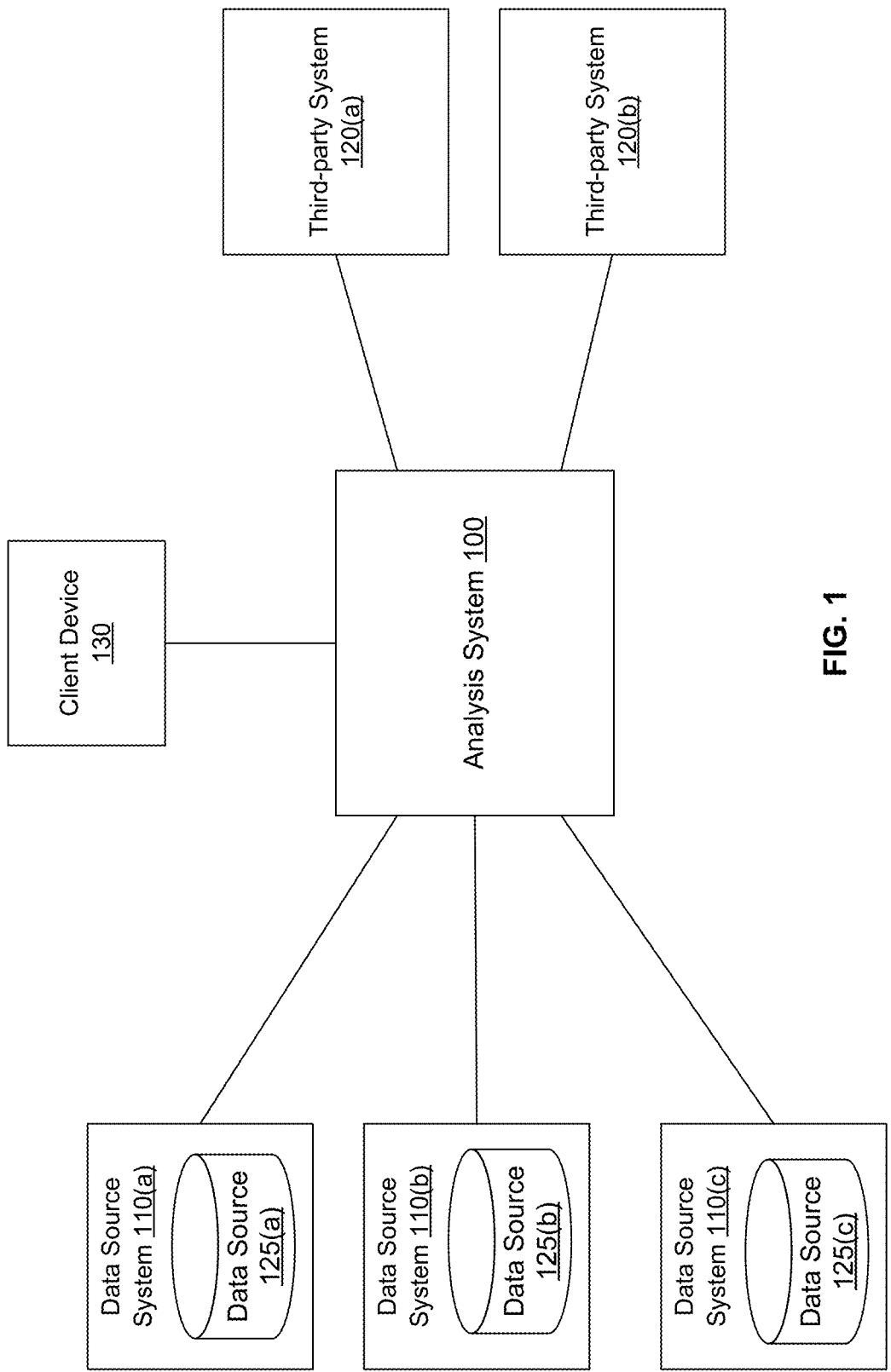
FIG. 1 is an overall system environment for performing data model based analysis of data, in accordance with an embodiment.

FIG. 1 is an overall system environment for performing data model based analysis of data, in accordance with an embodiment. The system environment comprises an analysis system 100, one or more data source systems 110, one or more third party systems, and one or more client devices 130. The analysis system 100 obtains data and metadata from various data source systems 110 and data models from third party systems 120 and performs analysis of the data stored in the data source systems using the data models. The analysis system may present the analysis via a user interface of the client device 130. The details of the analysis system 100 are further described herein, for example, in FIG. 2.

The data source systems 110 store data, for example, data used by an organization or enterprise. A data source system 110 comprises instructions for processing data stored in the data source system 110 and one or more data sources 125. A data source 125 of the data source system 110 has a data source type, for example, a relational database, a file system, a document oriented database system, and so on. As a result, the system environment shown in FIG. 1 comprises the analysis system 100 connected to a plurality of heterogenous data sources, each data source possibly having a distinct data source type.

The analysis system 100 executes the instructions of the data source system 110, for example, by invoking the API (application programming interfaces) of the data source system 110 to access the data of the data source 125. For example, a data source system 110 may be a database management system such that the data source is a database. The analysis system 100 may execute API such as JDBC to access the data stored in a database management system. As another example, a data source system 110 may be a file system, for example, HDFS (HADOOP file system) and the data source refers to the files of the file system that store the data.

A particular type of data source may have multiple instances, for example, instances of relational databases. Different instances of a data source may be provided by different vendors. For example, the same organization may store data in relational databases including instances of ORACLE database, SQLSERVER, TERADATA, MYSQL, and so on. Other examples of data sources include data lakes, for example, data lakes offered by CLOUDERA; files stored in a distributed file system, for example, HDFS (HADOOP distributed file system; and cloud data warehouses. A data source may be stored in a cloud based system, for example, AWS (AMAZON web services), MICROSFT AZURE, and so on.

The third-party systems 120 provide additional information, for example, data models to the analysis system. In an embodiment, a data model represents a virtual data model generated from questions received from users. The analysis system 100 may store the virtual data models generated from questions and use them for processing subsequent questions received from users. In an embodiment, a data model comprises entities and relations between entities. Each entity may comprise attributes (also referred to herein as fields). Each entity represents a set of records. A data model is associated with a set of questions that can be answered using the data model. The questions may be natural language questions or may be specified using a programming language. The questions can be translated into instructions for processing the question using the data model. For example, the instructions may use operations such as filtering, selecting fields, joining entities using relations and so on. The data model may specify data types of the fields. The data model may specify additional information describing the fields, for example, data format of the fields. For example, a field storing address information may be required to conform to certain data format used by standard addresses, a field storing date values may conform to certain date formats, and so on.

The client device 130 used by a user for interacting with the analysis system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 130 can be any device having computer functionality, such as a personal digital assistant (PDA), mobile telephone, smartphone, wearable device, etc. The client device 130 may be used by a user to view results of analysis performed or for providing instructions to the analysis system 100.

FIG. 1 and the other figures use like reference numerals to identify like elements. A letter after a reference numeral, such as "110(a)" indicates that the text refers specifically to the element having that particular reference numeral. A reference numeral in the text without a following letter, such as "110," refers to any or all of the elements in the figures bearing that reference numeral (e.g. "110" in the text refers to reference numerals "110(a)" and/or "110(n)" in the figures).

The interactions between the analysis system 100 and the other systems shown in FIG. 1 are typically performed via a network, for example, via the Internet. The network enables communications between the different systems. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

System Architecture

Figure 2:
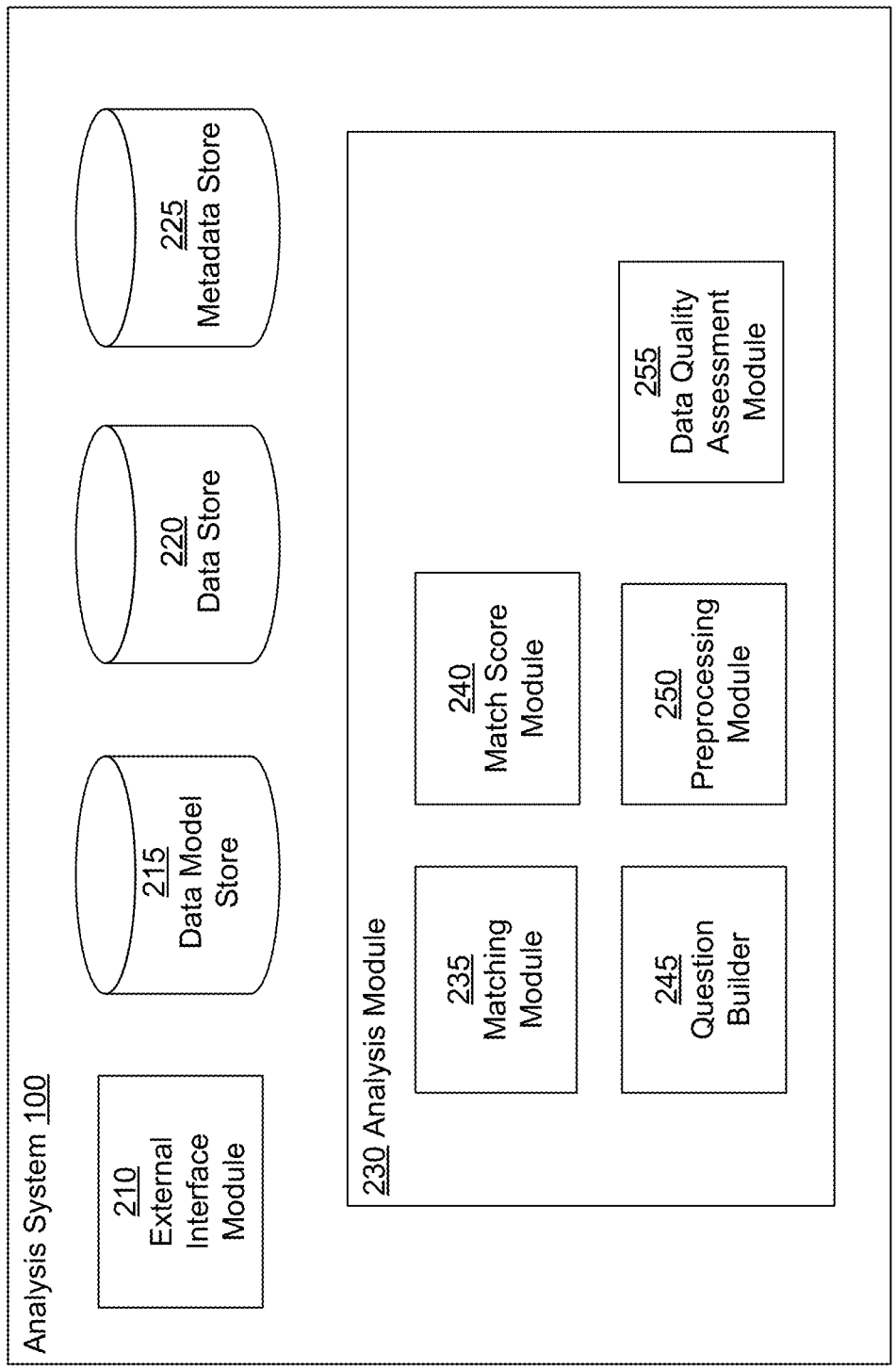
FIG. 2 is the system architecture of an analysis system for performing data model based analysis of data, in accordance with an embodiment.

FIG. 2 is the system architecture of an analysis system for performing data model based analysis of data, in accordance with an embodiment. The analysis system 100 includes an external interface module 210, a data model store 215, a data store 220, a metadata store 225, and an analysis module 230. Other embodiments may include fewer or more modules than those indicated herein. Functionality indicated herein as being performed by a particular module may be performed by other modules instead.

The external interface module 210 interfaces with external systems, for example, data source systems 110, third party systems 120, and client devices 130. In particular, the external interface module 210 receives connection parameters for connecting with external systems, for example, data source systems 110. The external interface module 210 establishes a connection with the data source system 110 to receive metadata or data from the data source system. The external interface module 210 stores metadata received from data source systems 110 in the metadata store 225 and data received from data source systems in data store 220. The external interface module 210 establishes connections with the third-party systems 120 to receive data models. The external interface module 210 stores data models received from third-party systems 120 in the data model store 215. The analysis module 230 also generates virtual data models from questions asked by users and stores them in the data model store 215.

The analysis module 230 comprises other modules including the matching module 235, match score module 240, question builder 245, pre-processing module 250, and a data quality assessment module 255. The actions performed by these modules and the processes executed by these modules are further described herein.

The matching module 235 matches the metadata describing the data stored in the data source systems 120 against questions, for example, using virtual data models generated form questions to determine whether the data source provides the required information.

The match score module 240 determines a match score for questions or data models matched against data of one or more data sources. The match score module 240 matches the table names/file names or names of collections of data of the data source to determine whether a question or data model matches data of the data source.

The question builder 245 allows users to ask natural language questions that the analysis system converts to query languages processed by systems, for example, SQL (structured query language). The question builder 245 receives requests from users to identify questions that can be answered using one or more data sources and performs the processing necessary to answer the questions.

The pre-processing module 250 determines quality of data that is available for answering a question or questions associated with a data model and determines whether pre-processing is required for improving the quality of the data. The pre-processing module 250 makes recommendations for portions of data that should be cleansed to improve the quality of the data to process a question.

The data quality assessment module 255 determines measures of data quality of data sources to improve matching accuracy. In an embodiment, the data quality assessment module 255 measures data quality based on analysis of values stored in a data source, for example, based on number of null values stored in a column, number of format errors in values stored in a column, and so on. The data quality assessment module 255 determines and provides metrics indicative of data quality to the match score module 240 and the match score module 240 uses the metrics received for determining match scores for data models or questions.

The different modules of the analysis system 100 may execute instructions in response to commands executed by a user via a user interface of the client device 130. For example, the analysis system 100 may present a user interface via a client device 130 that allows a user to interact with the analysis system 100 to identify various questions that can be answered using the data sources used by an organization and execute specific question.

Workflow Scenarios

FIGS. 3A-H illustrate the user interfaces for interacting with the analysis system, in accordance with an embodiment. The user interfaces may be presented by an application, for example, the internet browser executing on a client device 130 that interacts with the analysis system 100.

FIG. 3A shows a user interface presenting a comprehensive view of all data sources available in a system environment, according to an embodiment. The user provides information describing various data sources 305 in a system environment to the analysis system 100. The information describing a data source includes the address for creating a connection with the data source, for example, a network address or a URL (uniform resource locator). The information describing a data source may include a port number for creating a connection with the data source. The information describing a data source may include credentials required for creating a connection with the data source, for example, a login identifier and a password or a security token that allows the analysis system 100 to create a connection with the data source. The analysis system 100 may connect with different types of data sources including relational data management systems (RDBMS), HADOOP file system (HDFS), cloud based systems such as S3 file system, and so on.

Each data source comprises data assets that represent smaller units of data storage, for example, tables in an RDBMS, or files in a file system. The analysis system 100 connects with various data sources and retrieves metadata describing the data in each data source without retrieving data stored in the data assets. Examples of metadata include various fields in a table or various columns in a file. For example, if a user table stores information describing specific users, the analysis system 100 retrieves metadata such as various fields of the table but does not retrieve records describing specific users. The analysis system 100 presents information describing data assets of a data source to the user via a user interface that allows the user to select specific fields for further analysis.

Figure 3B:
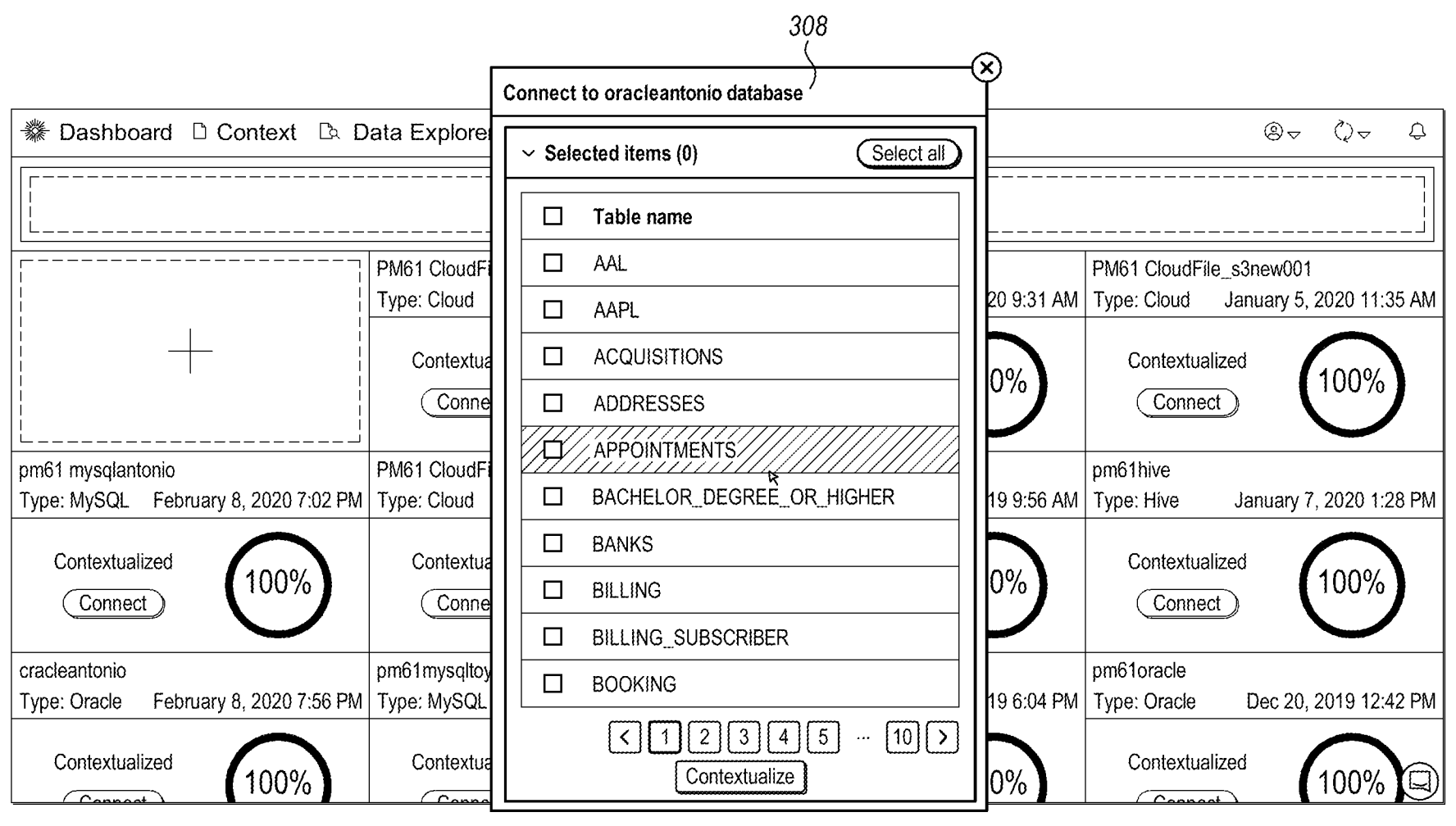

FIG. 3B shows a user interface for allowing a user to select specific data assets to be processed in a data source, according to an embodiment. The user interface 308 displays various data assets comprising tables of a database and is configured to receive selection of a subset of the data assets (e.g., tables). The analysis system 100 may store information describing the user selections and use the selected subset of data assets for further analysis.

In some embodiments, the analysis system 100 allows users to copy data or files or tables to a sand box system separate from the data source. The analysis system 100 accesses the sand box system to access the metadata describing the copied data. This allows the data source to provide the metadata to the analysis system 100 without providing access to the data source. In an embodiment, the sand box system is provided by an entity associated with the data source, for example, an enterprise that maintains the data source systems.

The analysis system 100 presents a user interface comprising a widget 310 for receiving search requests from users. The search requests received may comprise search keywords or search expressions. The search request may be a natural language sentence such as a question. The analysis system 100 identifies various data assets or combinations of data assets that can be combined to answer the search request.

In some embodiments, the analysis system 100 connects to a data catalog of a data source to access the metadata. The metadata collected by the analysis system 100 also includes names, tags, and synonyms defined by the data source. A synonym refers to a new name defined for a data asset, for example, an alias.

Figure 3C:
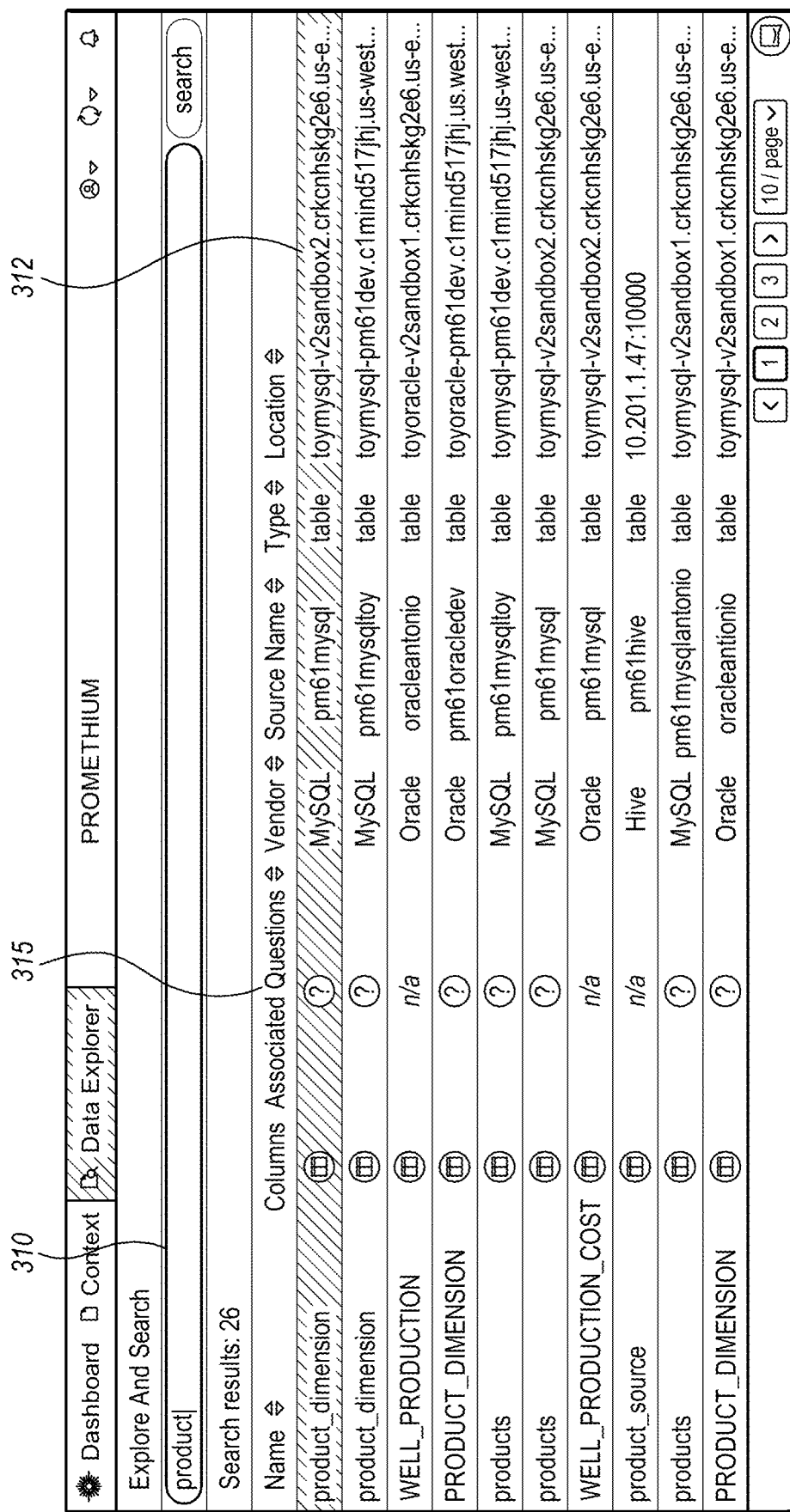
FIG. 3C shows the user interface for receiving a search request and presenting data assets that match the search request, according to an embodiment.

FIG. 3C shows the user interface for receiving a search request and presenting data assets that match the search request, according to an embodiment. As shown in FIG. 3C several results 312 representing data assets matching the search requests may be presented via the user interface. The analysis system 100 performs the search across multiple data sources and identifies any data asset that matches the search request including tables, columns, files, and so on. The user interface provides the file/table/column name, a vendor name for the data source, a system name for the data source, a data type for the data asset, and location (URL) of the data source.

The analysis system 100 allows users to determine how a particular data asset returned as a search result is being used by other users. The analysis system 100 provides a column 315 storing information describing associated questions for each data asset. The user can interact with the fields of the column 315 to access questions associated with the column. Accordingly, the analysis system presents a user with a set of questions associated with a data asset representing the search result.

FIG. 3D shows the user interface for presenting associated questions for a search result, according to an embodiment. The associated questions may represent questions that were asked by other users for which this data asset was returned. The analysis system stores these questions and associated execution plans and virtual data models. An associated question is also referred to herein as a stored question since the question was previously asked by user and is stored by the analysis system.

In an embodiment, the analysis system 100 tracks the search results that a user accessed to identify questions associated with a data asset. For example, if a data asset is returned as a result of a natural language question and the user accesses the data asset returned in response to the question, the analysis system associates that question with the data asset. Similarly, if a data asset is returned as a result of a natural language question and no user accesses the data asset returned in response to the question, the analysis system does not associate that question with the data asset.

In an embodiment, the analysis system stores weights with each association between a data asset and a question. For example, the weight of an associated question for a data asset may depend on the frequency with which a data asset is accessed by users in response to the question. The weight of an associated question for a data asset may depend on the amount of time that the data asset is accessed by users in response to the question. The higher the frequency with which a data asset is accessed in response to a question, the higher the weight of the association between the question and the data asset as determined by the analysis system 100. Similarly the higher the amount of time that a data asset is used by users, for example, for processing or for viewing information describing the data asset in a user interface, the higher the weight of the association between the question and the data asset as determined by the analysis system 100.

Figure 3E:
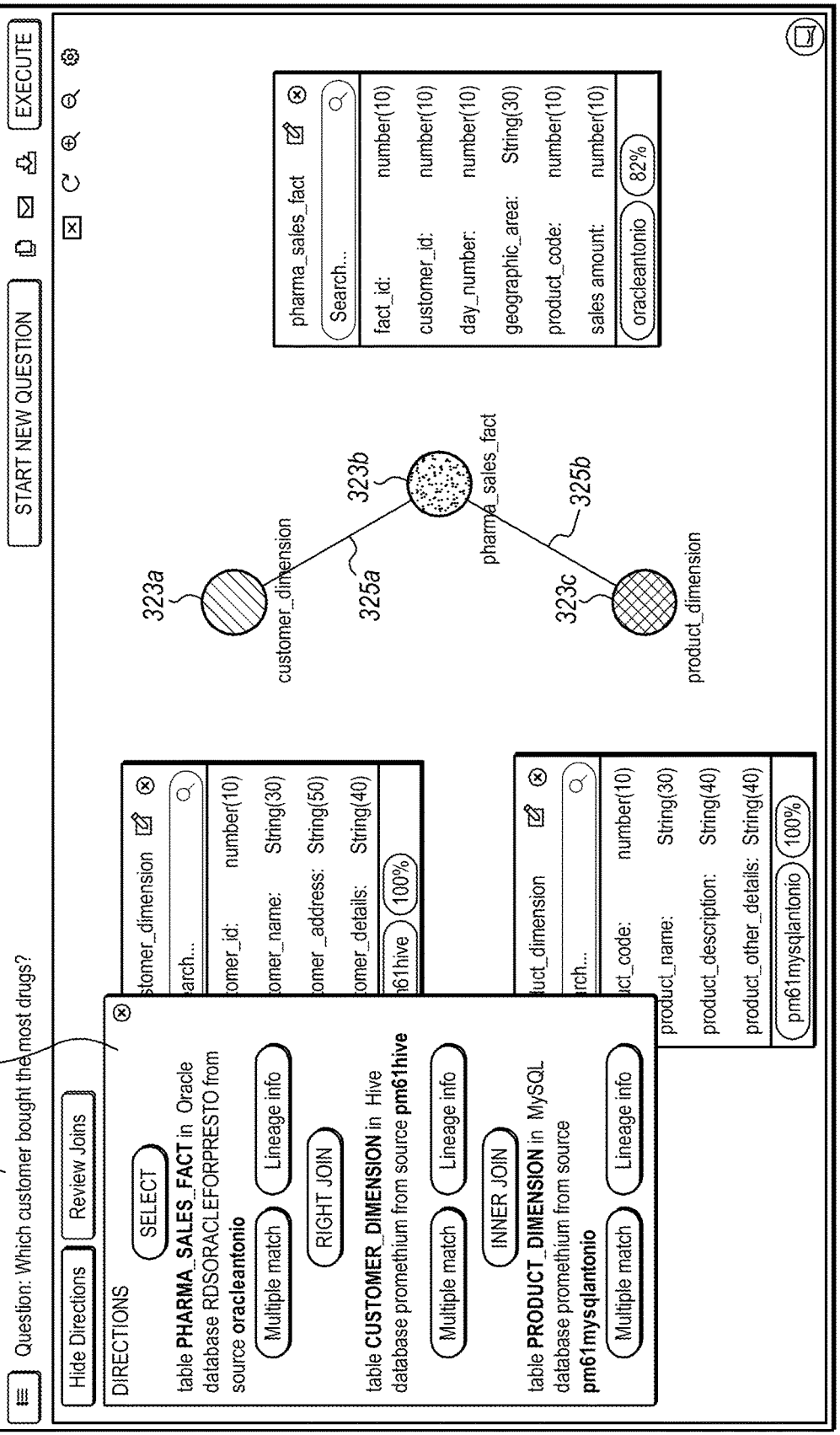
FIG. 3E shows a user interface presenting a virtual data model for a question, according to an embodiment.

In an embodiment, the analysis system 100 builds a virtual data model representing a question. The virtual data model may comprise one or more entities and relations between the entities. FIG. 3E shows a user interface presenting a virtual data model for a question 320, according to an embodiment. The virtual data model comprises entities 323a, 323b, 323c and relationships between the entities, for example, relationship 325a between entities 323a and 323b and relationship 325b between entities 323b and 323c. The analysis system 100 further generates and displays instructions 328 representing directions to the various systems for accessing the required data assets from their corresponding data source to be able to answer the question 320. The instructions may specify how the various data assets should be combined to generate the result, for example, whether two tables should be joined, what columns to use for joining and the type of join (inner join, left outer join, right outer join, etc.)

Figure 3F:
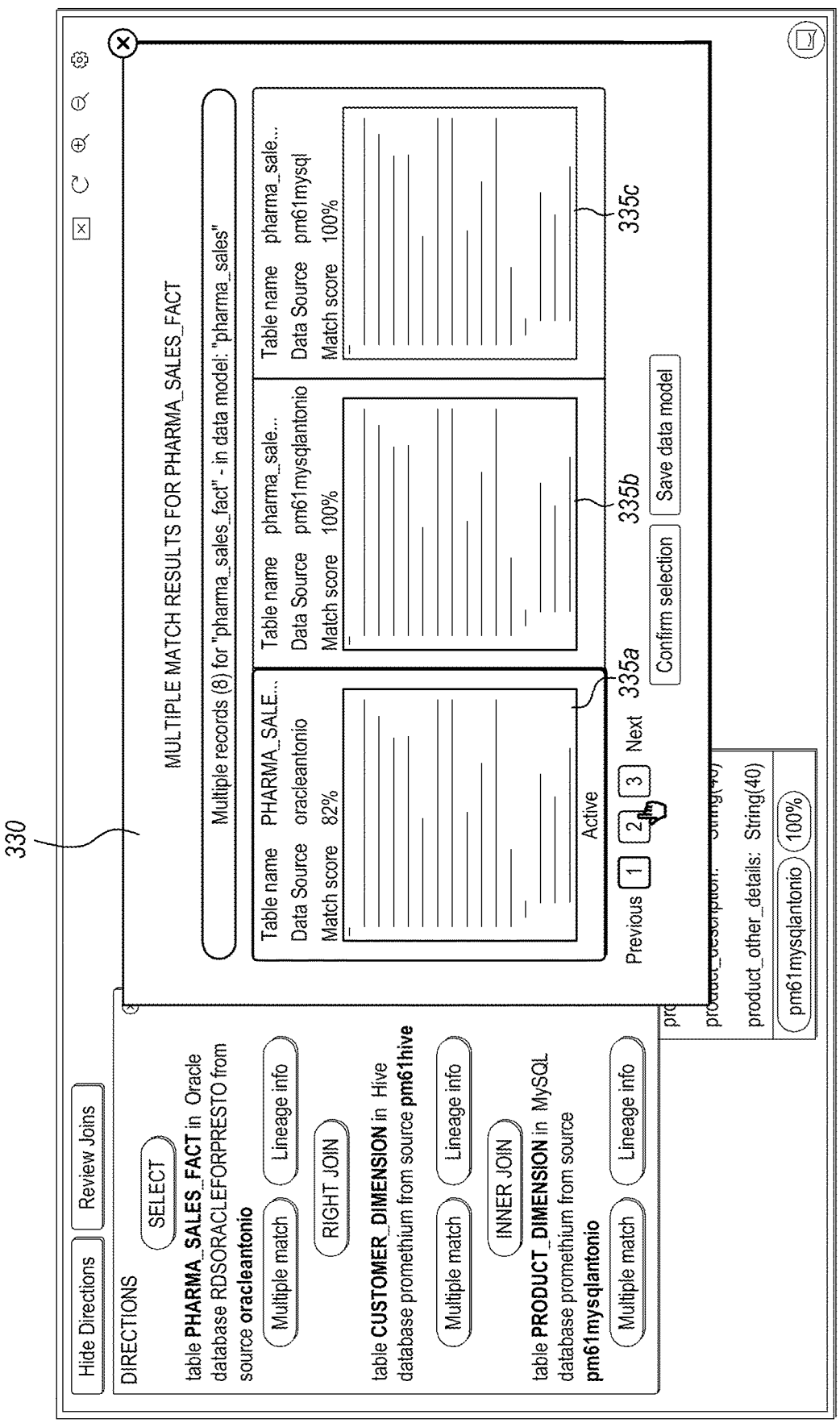
FIG. 3F shows the user interface for allowing a user to modify the data asset corresponding to an entity of the virtual data model corresponding to a natural language question, according to an embodiment.

The user interface further allows a user to inspect all possible data assets that may correspond to an entity in the entity relationship graph representing the virtual data model constructed for the question 320. FIG. 3F shows the user interface for allowing a user to modify the data asset corresponding to an entity of the virtual data model corresponding to a natural language question, according to an embodiment. For example, the user interface 330 shows several data assets 335a, 335b, 335c and so on corresponding to an entity from the virtual data model for a question 320. The user interface 330 allows a user to inspect the various data assets corresponding to an entity and select a particular data asset. For example, the analysis system 100 may rank the data assets based on their relevance and select a data asset by default. However, the user interface 330 allows the user to change the selected data asset and use a different data asset for that entity. The analysis system 100 uses any modified data assets for answering the question received from the user.

Figure 3G:
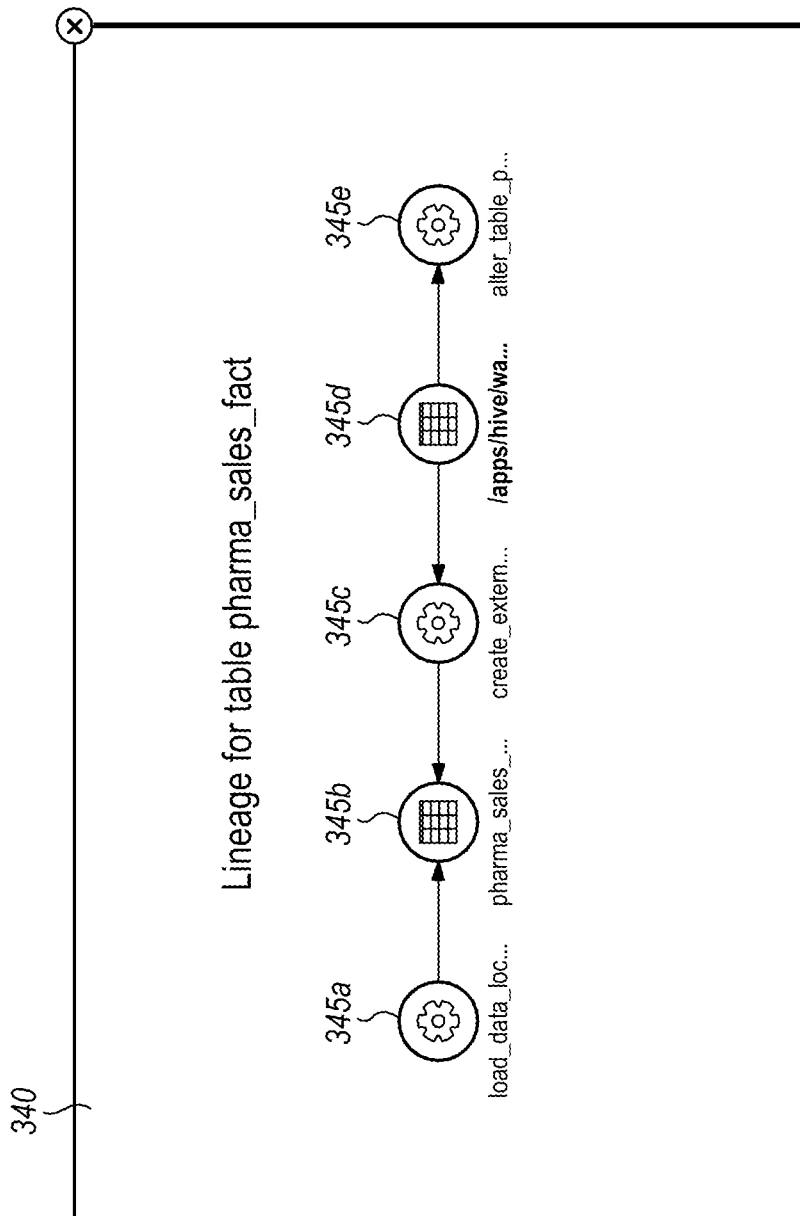
FIG. 3G shows a user interface for allowing a user to view lineage of data, according to an embodiment.

The analysis system 100 stores lineage of data assets representing information describing where the data stored in the data asset was obtained from. The analysis system shows the lineage via a user interface and allows users to inspect lineage of a data asset. FIG. 3G shows a user interface for allowing a user to view lineage of data, according to an embodiment. In an embodiment, the user interface 340 shows the lineage of a data asset as a data graph where each node represents either an action performed to obtain data, for example, a load operation or a data source such as a file or a table from where the data was obtained. The lineage graph shown in the user interface allows a user to track the original of a data, thereby determining whether the data was obtained from a reliable source, for example, whether the data was obtained from a source that conforms to certain privacy policy. The analysis system 100 allows a user to determine whether using data stored in a particular data asset will expose the user to certain liabilities, for example, if the data was obtained from a source that violated certain privacy policies.

Process for Accessing Data from Heterogeneous Data Sources

Figure 4:
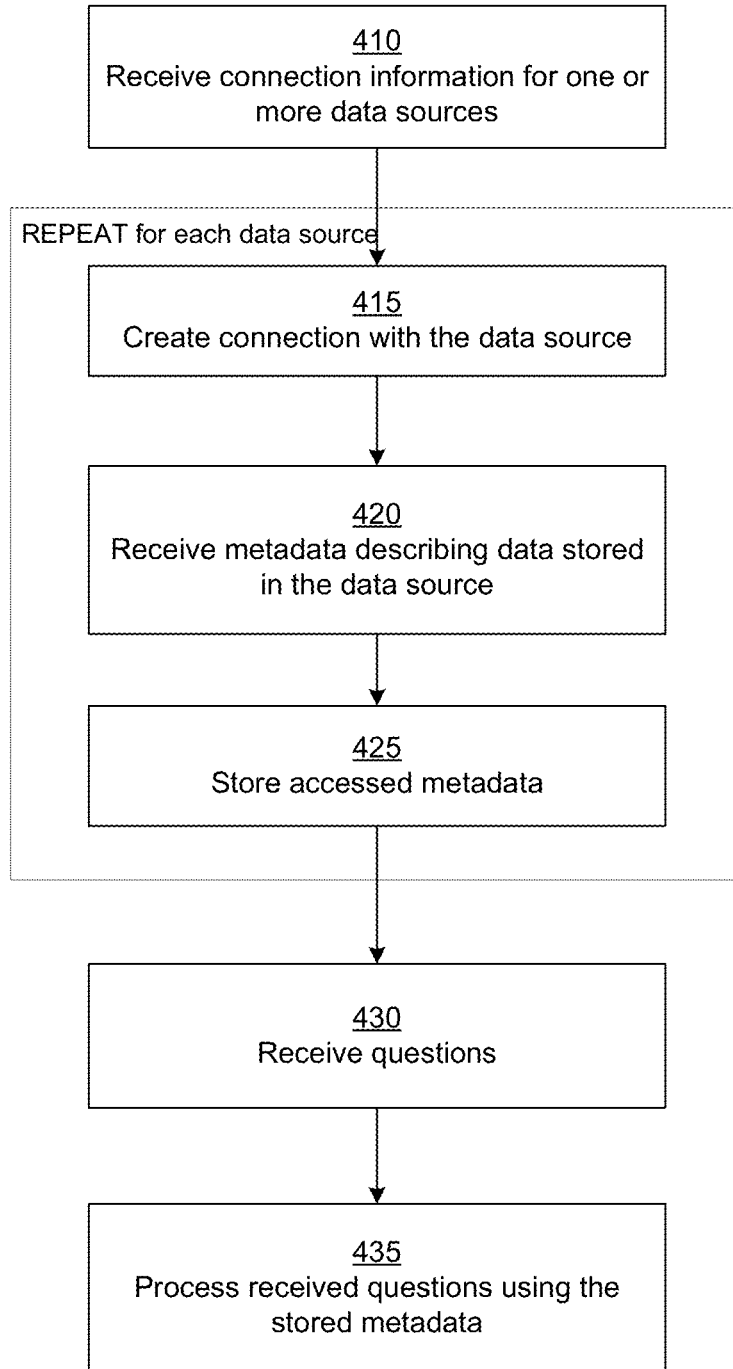
FIG. 4 is the overall process of collecting data used by the analysis system, in accordance with an embodiment.

FIG. 4 is the overall process of collecting data used by the analysis system, in accordance with an embodiment. The analysis system 100 interacts with a plurality of heterogeneous data sources for processing questions. The analysis system 100 receives 410 connection information for one or more data sources. The connection information may include an address and port number for establishing a connection with a data source system 110. The connection information may also include login information, for example, user name and password for connecting to a data source system.

The analysis system 100 repeats the steps 415, 420, and 425, for each data source. The analysis system 100 creates 415 a connection with the data source system 110. The analysis system 100 receives 420 metadata describing the data stored in the data source 125 of the data source system 110 using the connection created with the data source system 110. The analysis system 100 stores 425 the accessed metadata in the metadata store 225.

In an embodiment, the analysis system identifies what data matched and what did not match across table names, file names, field names, and metadata values. The analysis system uses metadata to create a dynamic mapping to an entity relationship diagram based off of the data model that represents a live view of the data sources. The analysis system creates step-by-step directions of how to find the data, how to access the data and assemble the data to construct the data model.

The metadata received by the analysis system 100 may include names of tables, files, or any named unit of data storage of the data source. The named units of data storage store collections of records or rows of data. The metadata further comprises fields for each table. A field of a table may also be referred to as a column of the table. The metadata may further comprise information describing the data source, for example, data types of each field, statistics describing the table (e.g., size of the table), and so on. In an embodiment, the analysis system 100 accesses samples of data from each table or file to extract additional information describing the data.

The analysis system 100 receives questions, for example, natural language questions from users. The analysis system 100 processes the questions using the metadata obtained from the data sources. In an embodiment, the analysis system receives one or more data models from one or more third party systems and stores the accessed data models in the data model store 215. In an embodiment, the analysis system 100 generates virtual data models based on the received questions and stores the virtual data models in connection with the question corresponding to the virtual data model. The analysis system 100 may compare a new question received from a user against the stored data models including stored virtual data models of previous questions to determine if any of the stored data model either answers the new question or provides at least a portion of answer to the new question, for example, a partial result that can be further processed to answer the question.

Processing Natural Language Questions Based on Data Stored in Heterogeneous Data Sources Embodiments allow a user to ask natural language questions and answer the natural language questions by identifying specific data that is required to answer the question, identifying a subset of a plurality of data sources that provide the required data without actually fetching the data from the sources, generating instructions (e.g., statements, queries, or commands) to process combine the data, and executing the instructions. The plurality of data sources may include data sources having different architectures, for example, relational database management system (e.g., ORACLE or DB2), cloud based system (e.g., Amazon Web Services or AWS), and parallel database systems (e.g., TERADATA).

Accordingly, the input required from the user is limited to (1) the question that the user wants to ask and (2) the filters to specify which subset of data the user would like to process (e.g., recent data, data within a range of a particular column, and so on). Furthermore, the generated queries ensure that the data of each data source is processed by the data source and a partial result is fetched from each data source and aggregated by the analysis system. Since the analysis system receives only the subset of data representing the filtered data and processes the subset of data (which is small in size), the analysis system can process the data in-memory and is highly efficient.

The analysis system sends the filters/limits (or range) corresponding to each data source to the data source to execute a subquery at the data source. The analysis system receives only the filtered data from each data source as a partial result. The analysis system joins the filtered data to determine the aggregate result representing the answer to the question. The analysis system determines the keys to be used for performing the joins and also generates the instructions for performing the joins.

Figure 5:
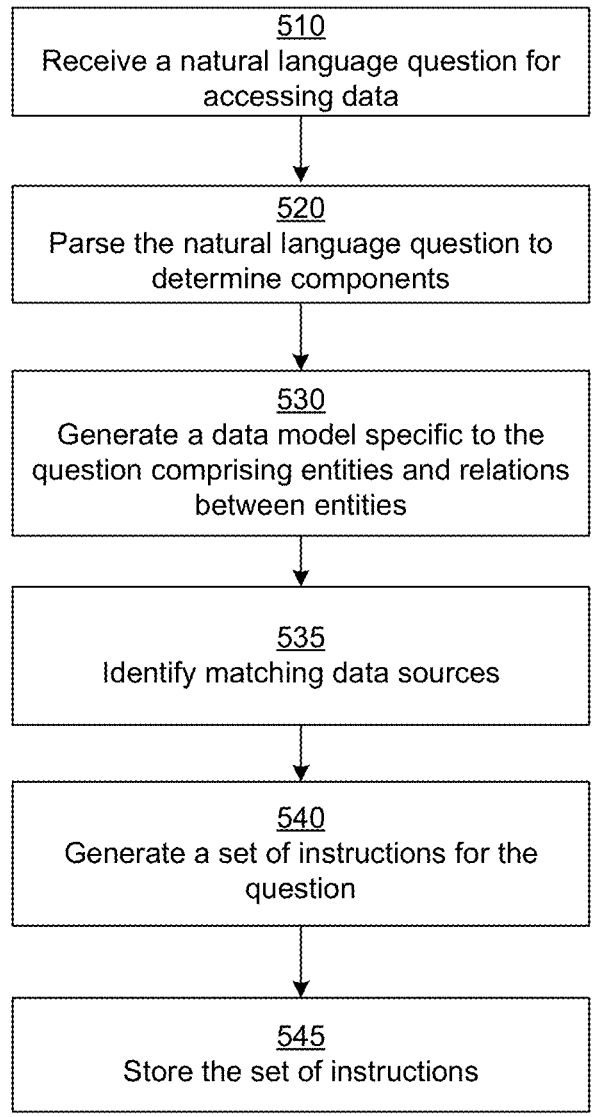
FIG. 5 shows a process of receiving and processing a natural language question by generating a virtual data model, specific to the received natural language question, according to an embodiment.

FIG. 5 shows a process of receiving and processing a natural language question by generating a virtual data model, specific to the received natural language question, according to an embodiment. The analysis system receives 510 a natural language question for accessing data that may be spread across a plurality of data sources. The analysis system parses 520 the natural language question to determine various components of the question including the data elements that are referred to in the question and the intent of the question. The analysis system generates 530 a virtual data model specific to the data fields identified as matching the natural language question. The virtual data model comprises entities that contain the data fields and relations between the data entities. The analysis system identifies 535 data sources that match the generated virtual data model.

In an embodiment, the analysis system identifies multiple data sources and ranks them based on their relevance to the data model to select a particular data model. The analysis system generates 540 a set of instructions for accessing and processing the necessary data to answer the question. These set of instructions are also referred to herein as an execution plan for the question. The analysis system stores 545 the generated set of instructions in association with the question. The system may execute the instructions to generate the answer and present the answer. Alternatively, the analysis system may send the instructions for review or for manual execution by a user, for example, a system administrator.

A user may specify filters to identify the subset of each type of data that needs to be processed. The user may specify certain limits (upper and lower limits of rows), for example, a user may specify that the first 100 rows of the data should be used to answer the question. A user may specify that rows with an attribute value within a specified range must be used to answer the question, for example, rows that represent data collected in the past one year. The user may specify that all records having an attribute value within a lower limit and an upper limit need to be processed.

The analysis system determines a subquery for each data source and sends the corresponding subquery to each respective data source. This provides additional resources to execute each subquery since the resources of the data source are typically more powerful that the analysis system. Furthermore, if there is sensitive data in the data source, the sensitive data is processed at the source and not copied to the analysis system.

The analysis system only receives a partial result obtained by processing the subqueries. For example, there may be data compliance issues at the data source. Fetching the data at the analysis system propagates the compliance issues to the analysis system. furthermore, if the generated results are transmitted to another system, the compliance issues are transferred to that system. Therefore, the analysis system minimizes copying of data from the source to minimize propagating any compliance issues. In an embodiment, the analysis system processes any data in memory and destroys the data after the processing without storing the data in a persistent store to minimize data compliance issues. Furthermore, since only the partial results are copied from the data sources to the analysis system and the partial results are typically much smaller than the amount of data processed at each data source, the transfer of data is fast.

In some embodiments, the question is based on a data model stored in the analysis system. In other embodiments, the question is independent of any data model. Accordingly, a user is able to ask questions and get answers from data stored across a plurality of heterogeneous data sources. Accordingly, the analysis system receives a natural language question and constructs on demand, a virtual data model (also referred to as a logical data model) representing the question asked.

A typical data model is designed to address questions related to a specific topic. A data model identifies entities and relations between entities to be able to answer questions based on the entities and their relations. Each entity may have one or more fields. Different portions of the data model may be used to answer different questions. The analysis system receives a question and determines a subset of the data model that is relevant to that particular question.

However, embodiments of the system allow users to ask a natural language question without referring to a data model. The analysis system analyzes the natural language question to generate a data model on the fly that is suitable for asking that specific question. The system accesses and stores metadata describing data from various data sources. In an embodiment, the system stores various keywords identifying the type of data stored in each field. The analysis system identifies various objects referred to in the question. The analysis system matches the objects referred to in the question with metadata of various data sources. In an embodiment, the analysis system analyzes the keywords to identify the relevant fields. The analysis system determines attributes of the various keywords of the question to determine which keywords represent filters. For example, the analysis system determines keywords that represent a quantity, keywords that represent a location, keywords that represent a noun/object, and so on. For example, if the analysis system receives a question with keyword "when", the analysis system identifies columns representing time in the table. If the analysis system receives a question with keyword "where", the analysis system identifies a column representing a location/place in the table. If the analysis system receives a question with keyword "dollar", the analysis system identifies a column representing a revenue/profit in the table.

The analysis system further analyzes keywords in the natural language question to determine the intent of the user in the question, i.e., the type of information that the user is looking for via that question. The analysis system uses the derived intent to infer the relationship between the various fields that are referred to in the question. In an embodiment, the system stores examples/types of data that is stored in each field. If a natural language question refers to a particular keyword that is likely to be present in that field, the analysis system determines that field as being relevant to that keyword in the question. The analysis system may match fields based on format of data stored in the data field and the format of a data value referred to in the question. For example, if the question uses the keyword "1980", the analysis system identifies a field that stores "year" in a table as being relevant for answering the question based on a match between the values stored in the "year" field and the value "1980" used in the question.

The analysis may match multiple data sources with each object from the question and may rank them in order of relevance to select the most relevant or most usable data source. For example, two data sources may store values of a particular attribute. However, one data source may store data in a manner that satisfies data compliance regulations whereas another data source may not be complaint. In this situation, the analysis system ranks the data from the compliance source higher. Similarly, one data source may store data that is better populated whereas the other data source may store mostly null values. In this example, the analysis system may rank the better populated data higher.

The analysis system furthermore determines relations between various attributes identified in the question. For example, if the question refers to information that maps to two different attributes A1 and A2 and A1 is stored in a data source D1 and A2 is stored in data source D2, the system analyzes metadata of the data sources D1 and D2 to determine the tables T1 and T2 that store the respective attributes A1 and A2. The analysis system analyzes the metadata of the tables T1 and T2 to determine the key columns required to join across the two tables T1 and T2. The analysis system generates queries to perform the required joins. The analysis system requests users to specify the filters for each table required to answer the question. The system receives the filters from the user. The system generates subqueries that apply the relevant filter for each table and computes the necessary subset of data from that table. The analysis system sends the respective subqueries to each data source. Each data source executes the respective subquery to generate a partial result set. The analysis system receives the results of execution of each subquery from the respective data source. The analysis system executes a final query for combining the received partial result to answer the question.

In an embodiment, the analysis system saves the questions in question store 265 to build a knowledge base of questions and their corresponding instructions that can be executed for answering the question. The knowledge base is used as a training data set for machine learning based models. The knowledge based is also used for recommending questions that can be asked using a given set of data sources. A user can search within the question store 265 for relevant questions. The user can select an appropriate question and the analysis system accesses the instructions for answering the questions and executes them.

The system analyzes past queries and natural language questions to build a data store of relations between entities. For example, if a query was previously processed that joins two tables in a particular way, the analysis system stores the relation between the two tables for use by subsequently received natural language questions. The analysis system also stores statistics based on the results, for example, the number of rows that were joined between two tables based on the question, number of null values present in the data that was processed for the question, and so on. The analysis system uses the statistics to rank the entities for subsequent question and determine which data sources should be used and which relations should be exploited to process the subsequent questions. Accordingly, statistics and analysis performed for past queries is used to determine relationships between fields and used for ranking data sources and relations between data sources for use in answering future natural language questions. The analysis system also uses existing data models, for example, data models that are standard across industries to determine relations between various fields of data sources that exist within and across data sources.

In some embodiments, the system recommends certain fields and relations between fields for answering a question but allows a user to edit the fields/relations used. For example, a user may prefer to use a field/relation that is ranked low by the analysis system. The system stores the user provided information. In an embodiment, the system uses the user input as labelled data for training a machine learning based model. The machine learning based model receives questions or information describing the question and predicts the fields and relations of a data model corresponding to the question. In some embodiments, the model receives keywords and intents extracted from a natural language question as input and predicts the fields/relations to use for processing questions based on the fields/relations. The model may receive an input data field/relation and an input question and generate a score indicating a measure of relevance of the field/relation to the input question.

Figure 6:
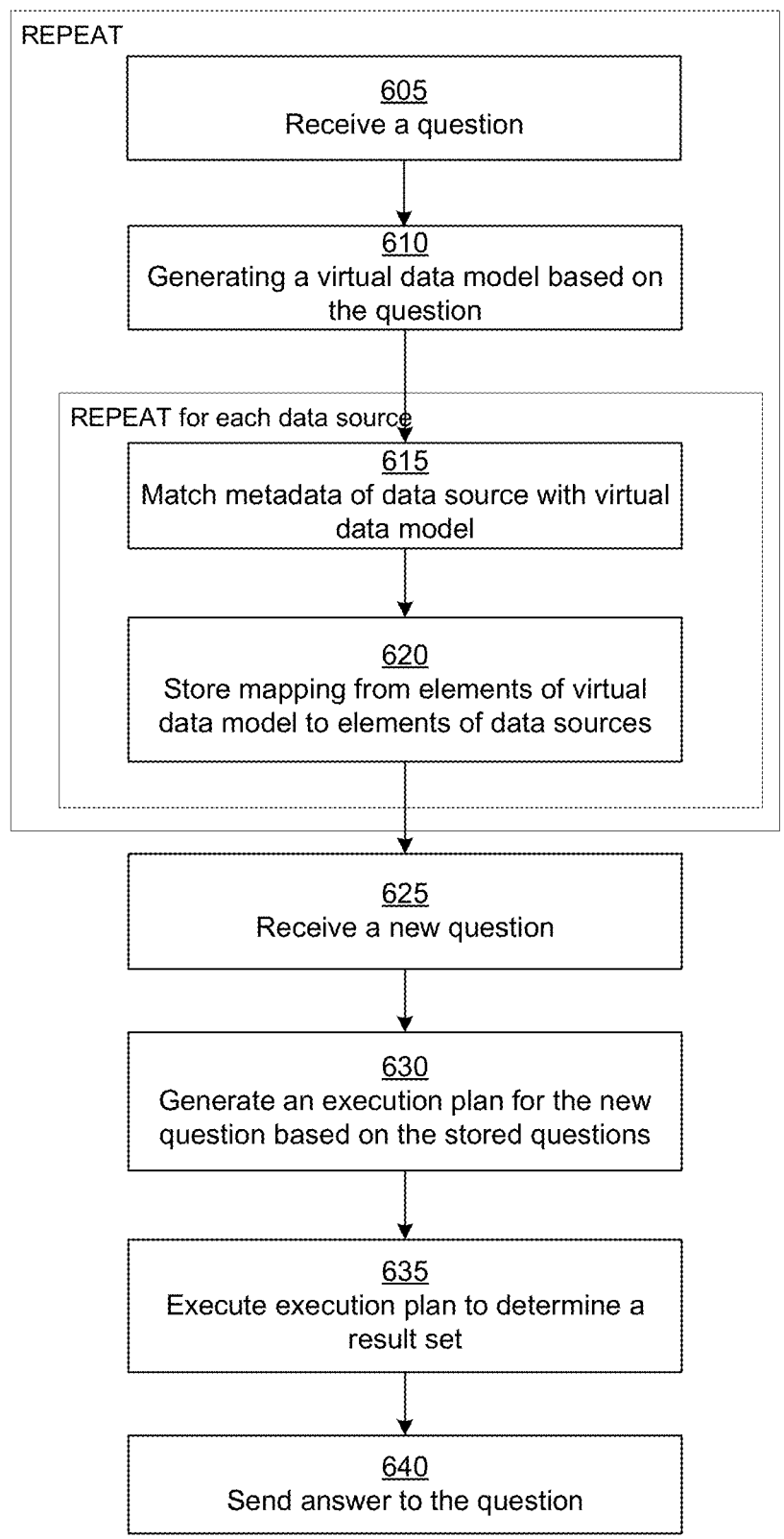
FIG. 6 illustrates the process of mapping data stored in data sources to natural language question, in accordance with an embodiment.

FIG. 6 illustrates the process of mapping data stored in data sources to natural language question, in accordance with an embodiment. The analysis system 100 may repeat the following steps 605, 610, 615, 620 multiple times. The analysis system 100 receives 605 a question, for example, a natural language question. The question may also be a search request or a search query using a structured query language. The analysis system generates 610 a virtual data model for the question. The virtual data model may represent entities identified in the questions and relations between the entities based on the question. The analysis system 100 maps the virtual data model to data assets of various data sources. The analysis system 100 repeats steps 615 and 620 for each data source that stores data of the organization. The analysis system 100 matches metadata of the data source with the virtual data model. The analysis system 100 stores the mapping from data elements of the data model to data elements of the data sources. In an embodiment, the analysis system 100 stores instructions for answering the question using data assets of one or more data sources. Accordingly, each received question may result in a data model being generated and stored in the analysis system 100. In an embodiment, the analysis system 100 determines a usage score for each question indicating how many times the question is invoked, for example, as a result of a user asking the same or very similar question or as a result of a user asking a question for which the stored question provides at least a portion of the answer.

The analysis system ranks the questions based on their usage score. The analysis system 100 uses the ranked order to determine which stored questions to match first against a new question. The analysis system 100 uses the ranked order to determine the order in which stored questions may be presented to a user in response to processing a new question, for example, by asking the user if the new question can be answered by answering any of a list of stored questions that match the new question. The analysis system 100 may prune a stored question and its corresponding virtual models if the question has less than a threshold usage score. This allows the analysis system 100 to manage storage and performance of processing new questions by maintaining a reasonable set of stored questions.

The analysis system 100 performs matching of entity names with tables names for a data source that is a database (or file names for file systems). If an entity name matches a table name, the analysis system 100 matches the columns as well to determine whether the table stores all or some of the data required to represent the entity. If the entity name does not match any table name, the analysis system matches the field names of the entity with column names of tables of the data source. If more than a threshold number of fields of an entity match the columns of a table, the analysis system stores a mapping from the entity to the table.

The analysis system 100 may store multiple mappings for a single entity or a single field. For example, columns of multiple tables may store the values corresponding to a field of an entity. Similarly, different tables or sets of tables may store values corresponding to an entity. The analysis system stores a match score indicating a degree of matching between an entity and a table or a set of tables. For example, columns of a table T1 may match 90% of the fields of the entity and columns of a table T2 may match only 60% of fields of that entity. Accordingly, table T1 has a higher match score with the entity compared to table T2.

In an embodiment, the analysis system 100 performs matches based on other metadata attributes of tables, for example, data type of various fields. In an embodiment, the analysis system 100 uses regular expressions associated with fields of the data model to determine whether a column in a data source matches the field of the data model. The analysis system 100 may perform match between elements of data sources and elements of a data model by sampling data from the data source and determining characteristics of the data for matching. For example, the analysis system 100 may sample data to determine characteristics of the data to infer data types for fields. The analysis system 100 uses the data types that may be specified in the metadata of the data sources or inferred from the sampled data to match elements of data model with elements of the data source. In an embodiment, the analysis system determines a match score as a weighted aggregate of scores indicative of matches of one or more of (1) table names and entity names (2) column names of data source with field names of entities in a data model, (3) data types, (4) any other metadata, for example, statistics describing the data elements.

In an embodiment, different entities of the data model may be mapped to different data sources, for example, entity E1 may be mapped to table T1 of data source D1 and entity E2 may be mapped to table T2 of data source D2. In an embodiment, different fields of an entity may be mapped to two different tables that may either belong to the same data source or to two different data sources. For example, entity E may have a set S1 of fields and a set S2 of fields. The set S1 of fields may be mapped to columns of table T1 and set S2 may be mapped to columns of table T2. Tables T1 and T2 may belong to the same data source or to two different data sources. In this example, the analysis system 100 identifies a relation between the two tables T1 and T2, for example, a foreign key/primary key based relationship.

The analysis system 100 receives 625 a new question associated with the data model. The analysis system 100 generates 630 an execution plan for answering the question based on the mapping. The analysis system 100 executes 635 the generated execution plan to determine a result set as an answer to the question. The analysis system 100 sends 640 the answer to the question, for example, to a client device that requested the answer.

Process for Ranking Data Assets and Stored Questions using Match Score

Figure 7:
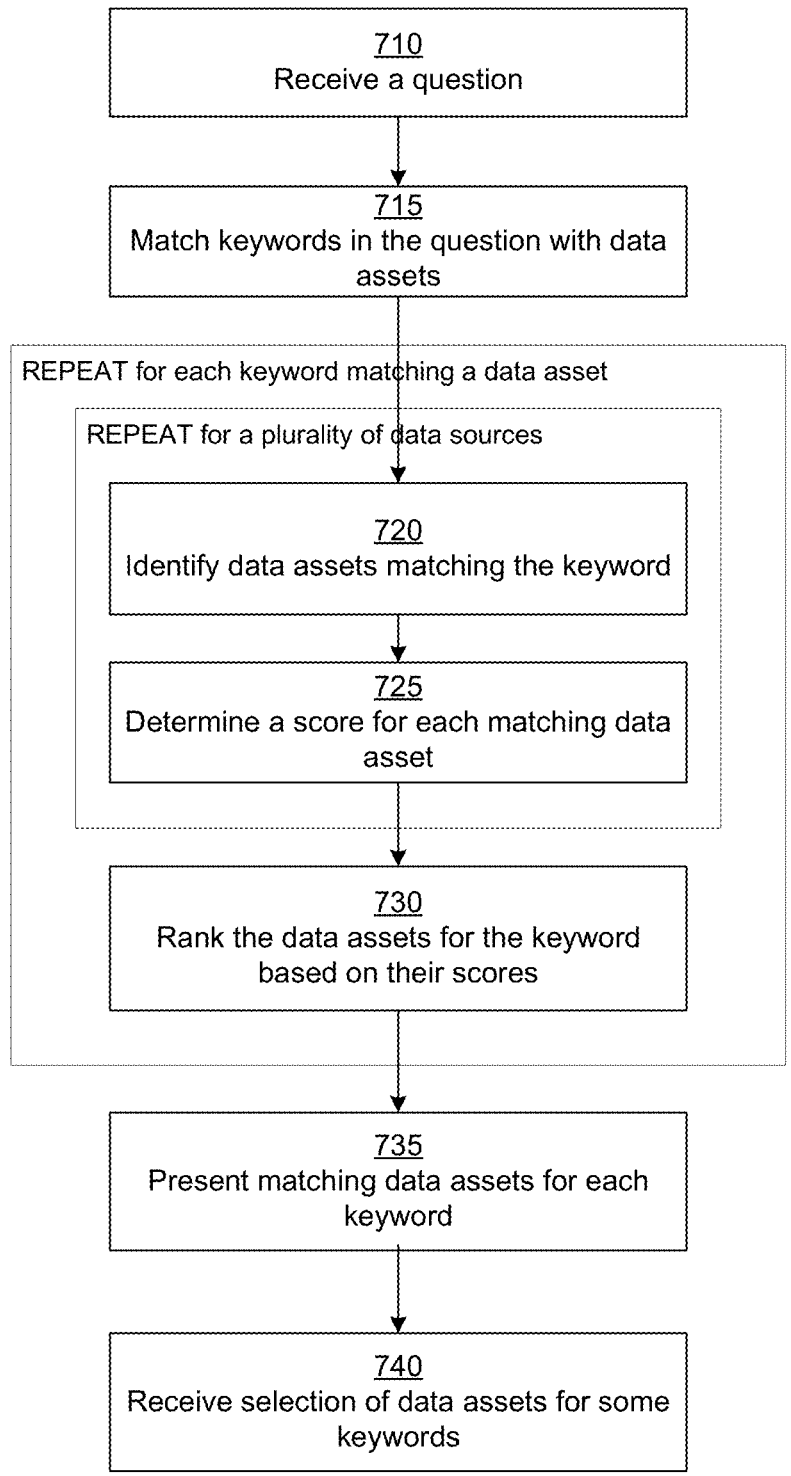
FIG. 7 is the process of ranking data assets for a question, according to an embodiment.

FIG. 7 is the process of ranking data assets for a question, according to an embodiment. The analysis system 100 receives 710 a question, for example, a natural language question. The analysis system 100 may generate a virtual data model for the natural language question, wherein the virtual data model comprises one or more entities and optionally relationships between entities. The analysis system 100 parses the questions to identify keywords that are likely to correspond to entities. The analysis system 100 may determine that keywords that represents objects in the natural language sentences, for example, subject and predicate are likely to match entities in a data model. The analysis system 100 matches 715 these keywords in the question with data assets of various data sources.

The analysis system 100 repeats following steps 720, 725, and 730 for each keyword K1 identified for matching against data assets. The analysis system 100 repeats the steps 720 and 725 for each data source. The analysis system 100 identifies 720 data assets matching the keyword K1 and determines a score for each matching data asset. For example, if the keyword is "employee", the analysis system 100 may associate the keyword with an entity Employee and identifies data assets that store employee data. The analysis system 100 may identify data assets corresponding to the keyword, for example, by matching the keyword based on matching of the name of the data asset, for example, name of the table or file name. The analysis system 100 may identify data assets matching the entity corresponding to the keyword or matching the keyword based on matching of the metadata, for example, description of the data asset. The analysis system 100 may identify matching data assets based on matching of the data stored in the data asset, for example, the format of the data. For example, the format of data may be used to determine that a column stores addresses or social security numbers, and so on.

The analysis system 100 determines 725 a match score for the matching data asset. The match score may be referred to as a score or as a relevance score for the data asset in relation to the received question. The analysis system 100 determines the match score for each data set in relation to a received question based on several criteria. The analysis system 100 determines a match score for a data asset based on the aggregate number of distinct questions previously asked that matched the data asset and are stored in connection with the data asset. Accordingly, the match score for a data asset is directly proportional to the number of distinct questions previously asked that matched the data asset. In an embodiment, the analysis system 100 determines a match score for a data asset based on a weighted aggregate of the previously asked questions that matched the data asset, wherein the weight depends on a match score for the previously asked question. The weight may be based on a degree of match between the previously asked question matched the received question indicating closely the previously asked question matches the received question.

In an embodiment, the match score of a data asset is weighted based on the amount of data stored in the data asset. For example, a data asset that has large amount of data is weighted higher than a data asset that has less data. The two data assets may be from two different data sources. The match score for a data asset may be weighted based on the number of times the data asset is accessed, e.g., directly related to a frequency of access of the data asset. Accordingly, the match score for the data asset is weighted high if the data asset is frequently accessed by users. In an embodiment, the match score for a data asset is determined based on a number of times the data asset is accessed after being presented as a result in response to a previously asked question. Accordingly, the analysis system 100 determines a match score to be a value that is directly related to the frequency of access of the data asset after being presented as a result in response to a previously asked question. The analysis system 100 may determines a match score for a data asset as a weighted aggregate over all previously asked questions associated with the data asset, wherein each previously asked question is weighted based on the frequency of access of the data asset in response to being presented as a result for that question.

In an embodiment, the analysis system determines a quality score for a data asset. The quality score may be obtained from the data source or determined by the analysis system by accessing a sample of data of the data asset from the data source. The quality score of a data asset may be directly related to the number of null values in the data asset or a number of values that have formatting errors. A formatting error may be present if the data is expected to conform a to some format rule but fails to conform. For example, values of a column of a table may be expected to satisfy a regular expression or another syntax but fail to conform. The quality score of a data asset is indicative of low quality if the percentage of data values in the data asset that are null or have format errors is greater than a threshold value.

The analysis system 100 ranks 730 the data assets matching a particular keyword based on their match score. The analysis system 100 presents 735 the ranked list of matching data assets for each keyword via a user interface. The analysis system 100 may select a subset of matching data assets based on the score for presenting 735. The analysis system 100 may select a default data asset to be used for each keyword, for example, the data asset with the highest score. The analysis system 100 presents a user interface to the user that allows the user to select a specific data asset to be used for each keyword. Accordingly, the analysis system 100 may receive a user selection of a data asset that may be different from the data asset selected by the analysis system based on the score. The analysis system 100 determines an execution plan for the question based on the selections of data assets.

Processing New Questions using Execution Plans of Stored Questions

Figure 8:
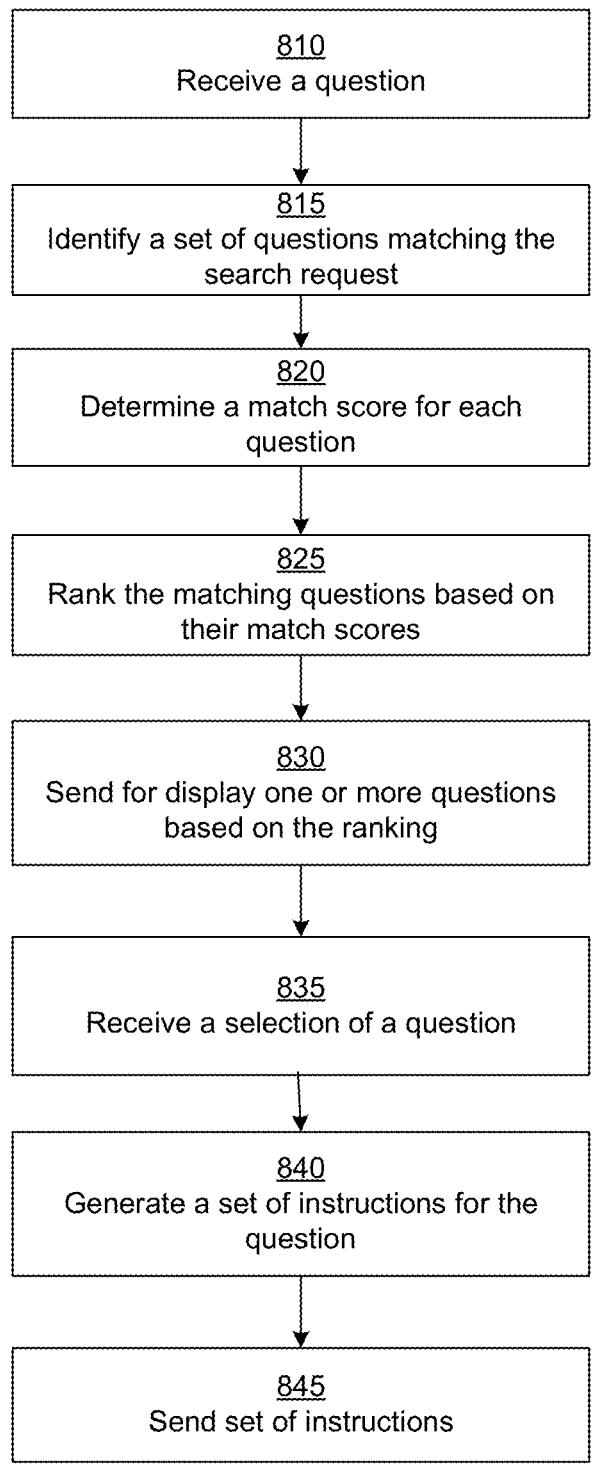
FIG. 8 is the process of processing questions using previously stored questions, in accordance with an embodiment.

FIG. 8 is the process of processing questions using previously processed questions, in accordance with an embodiment. The analysis system takes natural language questions and converts them to instructions in languages that can be processed by systems, for example, SQL (structured query language). The analysis system 100 receives 810 a question that may be a natural language question or a search request with one or more search keywords. The analysis system 100 stores previously received questions including natural language questions, structured language queries, and keyword based searches. These previously received and answered questions are referred to as the stored questions. The analysis system 100 identifies 815 a set of stored questions matching the received question.

In an embodiment, the analysis system 100 determines a match score for each stored question that is determined to match the received question. For each matching question, the analysis system determines 820 a match score based on number of fields/metadata/files/tables associated with the received question that match the fields/metadata/files/tables of the stored question. In an embodiment, the analysis system 100 performs semantic match of two input questions by comparing the natural language text of the two questions using a trained machine learning model, for example, using a neural network trained to received two natural language sentences as input and output a score indicating a degree of semantic match between the two input sentences. In an embodiment, the analysis system 100 matches two questions by generating a virtual data model for each input question and matching the two generated virtual data models. The virtual data models comprise an entity relationship graph and the analysis system 100 matches two virtual data models by matching their corresponding entity relationship graphs.

In an embodiment, the analysis system 100 weighs each question based on the number of times the question was invoked in the past. A question Q1 is invoked if a user asks the question Q1 directly, or if a user asks a question Q2 that matches the question Q1, thereby executing the execution plan of the question Q1, or if a user asks a question Q3 such that the execution plan of question Q1 is executed to generate at least a portion of the answer of the question Q3.

In an embodiment, the analysis system ignores certain values of the natural language questions when comparing two natural language questions. The analysis system 100 determines values of the natural language question that correspond to parameters in the generated virtual data model. For example, analysis system 100 determines that certain values mentioned in the natural language question map to parameters specifying a range in a question. The analysis system 100 ignores these values while comparing the natural language questions. This is so because the analysis system 100 reuses the execution plan of a stored question by replacing the parameter values of the stored question with the parameter values of the received question. This allows the analysis system 100 to reuse the effort previously spent in analyzing the stored question and generating the execution plan for the stored question.

The analysis system 100 ranks 825 the matching stored questions based on the match score. The analysis system sends 830 for display via a UI, one or more questions based on the ranking. In an embodiment, the analysis system 100 selects the highest-ranking question as the matching question and recommends it as the stored question that can be executed instead of the received question. If the user approves the recommendation, the analysis system 100 executes the approved stored question instead of the received question. In an embodiment, the analysis system 100 presents the execution plan of the matching stored question to the user and lets the user modify it before execution. For example, the user may modify the values of a range or values of certain parameters before execution.

In an embodiment, the analysis system 100 presents a user interface that presents a list of matching stored questions as the user inputs the new question. For example, the list of matching stored questions is presented in a drop-down list. The user may select a matching stored question without typing the entire new question. The analysis system 100 receives 835 the user selection and presents the stored question in a user interface. The user interface is configured to allow the user to modify the stored question, for example, to change certain parameters. The analysis system 100 receives the modified question and updates the execution plan based on the modifications to the question. For example, the analysis system 100 replaces the parameter values of the execution plan obtained from the stored question with the corresponding parameter values of the execution plan from the modified question.

In an embodiment, the analysis system 100 generates 840 a set of instructions for processing the data from the data sources to answer the questions. The analysis system 100 sends 845 the set of instructions either for display (e.g., via email), or for execution. The instructions may include: (1) instructions to extract data from a data source, (2) instructions to transform data to match formats across data sources, or (3) instructions to combine (join) data from different data sources to generate new tables.

Process for Selective Preprocessing of Data

Figure 9:
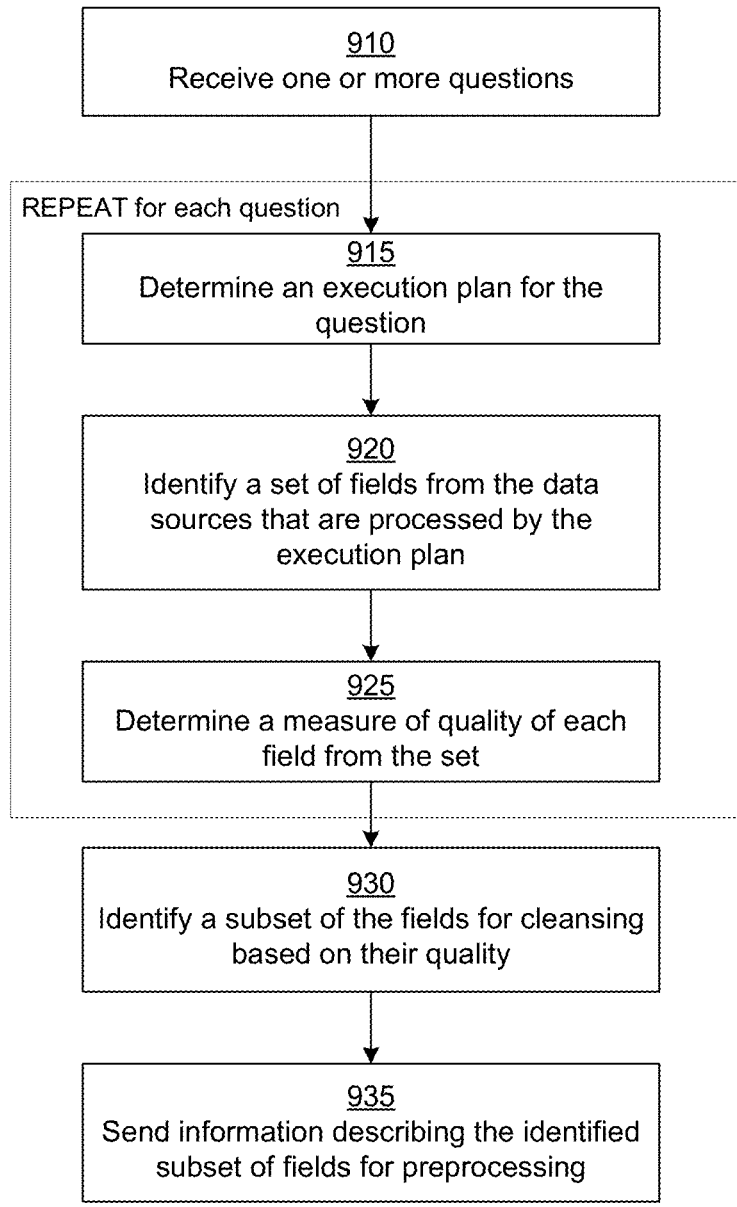
FIG. 9 is the process of performing preprocessing of data, in accordance with an embodiment.

FIG. 9 is the process of performing preprocessing of data, in accordance with an embodiment. The analysis system determines what data needs to be discovered, moved, assembled, cleaned, based on a question or a data model, for example, a virtual data model generated from a natural language question.

The analysis system receives 910 one or more questions. A question may be a natural language question based on data stored in one or more data sources. The analysis system repeats the steps 915, 920, and 925 for each question. The analysis system determines 915 an execution plan for the question. The analysis system 100 identifies 920 a set of fields/metadata/files/tables from the plurality of data sources that are processed by the execution plan. The analysis system 100 determines 925 a measure of data quality of each field from the set. The analysis system 100 may obtain the measure of data quality from the data source system 110 comprising the data source.

In an embodiment, the analysis system 100 provides instructions to the data source system 110 to determine the data source quality. The instructions may request specific processing of each data asset to generate measures of quality, for example, the instructions may determine a percentage of null or empty values in a column. The instructions may provide regular expressions for determining a percentage of values of a column, set of columns, or a table that do not conform to the regular expression. The instructions may provide any other criteria for determining a percentage of values of a column, set of columns, or a table that do not conform to the specified criteria. The analysis system 100 may identify 930 specific data assets of the data source and request data quality score for each specific data asset. In an embodiment, the data quality score is determined by accessing a sample of data of one or more data assets and analyzing the accessed data. In an embodiment, the data quality score is determined by accessing all the data of one or more data assets from the data source and analyzing the accessed data.

The data quality of a data asset may be determined based on different factors. In an embodiment, the data quality measures the frequency of occurrence of null values in the data asset, for example, percentage of data elements of a column or a table that have null values. In an embodiment, the data quality measures the frequency of occurrence of records or values in the data asset that fail to conform to certain formatting rules, for example, percentage of data elements of a column or a table that have incorrect data format. The expected format for a record or column may be specified using certain rules, for example, using regular expressions, context free grammars, or a function or set of instructions for checking the format. In an embodiment, the data quality measures the frequency of occurrence of records or values in the data asset that fail to conform to certain policy, for example, privacy policy. A policy may specify that the data of certain type must be stored using certain type of encryption or masking. The policy may specify that data of certain type may not be made available to users and must be protected by specific access control policies. In an embodiment, the analysis system 100 determines data quality based on lineage of the data by identifying the origin of the data. For example, the analysis system 100 determines data quality for a data asset to be low if the data stored in the data asset was generated from data obtained from a data source that violated certain policies, for example, privacy policy.

The analysis system 100 identifies 930 a subset of the total set of fields being processed for cleansing. The subset is identified based on the measure of quality, for example, by selecting fields determined to have low quality of data for preprocessing. In an embodiment, each field may be associated with a cost of cleansing the data. The analysis system selects fields based on their cost of cleaning the data along with the quality of the data. For example, the analysis system gives higher preference to fields that are cheaper to clean. The analysis system sends 935 information describing the identified subset of fields for preprocessing, i.e., cleansing of the data by taking measures that will increase the data quality.

If the analysis system 100 identifies a data asset that has a data quality score that is below a threshold, thereby indicating low data quality, the analysis system 100 sends information describing the reasons why the data quality is low. For example, the analysis system 100 may specify one or more data format rules that were violated by a data asset. The analysis system may send messages or alerts. The analysis system may send a report describing any non-compliant fields and identify the data format rules that were violated by the non-compliant fields. For example, the analysis system 100 provides the data source with the rules or policies that the data asset violates. The analysis system 100 may provide the data source with a regular expression if the elements of the data asset from the data source are determined to fail to conform to the regular expression.

In an embodiment, the data quality score indicates a level of compliance to any type of policy, for example, GDPR (General Data Protection Regulation) compliance or compliance to any privacy laws. If the analysis system 100 determines that the data asset has low data quality due to the lineage of the data asset including a data source that acts as an origin of data and the data source fails to conform to certain policy, the analysis system 100 provides information describing the lineage and information identifying the data source that fails to conform to the policy as well as information identifying the policy. This allows the users or system administrators to fix the data asset, for example, by regenerating the data of the data asset using data from a different data source that conforms to the policy and thereby modifying the lineage of the data asset. Cleansing of data may require developing transformations from the bad data to generate clean data. For example, a transformation may modify addresses having non-standard format to addresses having a standard format by rearranging various fields of the address.

The analysis system 100 receives indication that the data asset has been modified to improve the data quality. The analysis system 100 may reevaluate the data asset to measure its data quality score and determine whether the data quality score indicates an acceptable data quality. If the data quality score still indicates low data quality, the analysis system 100 continues to provide the data quality information to their respective data sources with information describing the reasons for low data quality, thereby allowing the data source systems to perform data transformations of changes that improve the data quality.

Responsive to cleansing of the data, the analysis system 100 may process the execution plan to obtain results for the question. In an embodiment, the analysis system considers multiple execution plans, for example, if the same data can be obtained from multiple sources or if there are multiple ways to combine data for a particular data model. The analysis system 100 evaluates different execution plans to identify the best execution plan, e.g., the execution plan that uses GDPR compliant data sources, or execution plan that requires minimum cleansing effort.

Execution of Questions Processing Data Across Multiple Data Sources

The analysis system may combine data across multiple data sources to answer questions. In an embodiment, the analysis system 100 performs a quick join process to join tables of data sources. The analysis system answers the question by accessing the metadata for the names of the tables/files/fields as well as the primary keys and foreign keys to perform the join and leave the remaining data at the data source. The analysis system therefore does not move the data or aggregate the data to determine a result for the question. The analysis system federates queries across multiple data sources with the data remaining in each data source. The analysis system performs data isolation so as to avoid retrieving data that may violate certain polices and combining it with other data that does not violate such policies. The data isolation ensures that the data that does not violate policies is kept separate from the data that violates policies. If the analysis system is required to combine such data, the analysis system tracks lineage of the data so that if necessary, data that violates certain policies can be identified and replaced with equivalent data from another data source that does not violate these policies. The analysis system is able to reuse all the scripts or instructions generated for performing such processing with the data from the new data source.

In an embodiment, the analysis system pulls in only the primary keys and foreign keys of tables to perform the join and leaves the remaining columns at the data source. As a result, if certain columns do not comply with certain policies (for example, if the data violates GDPR, i.e., General Data Protection Regulation), the analysis system processes the query without fetching these columns.

The analysis system 100 receives a question that can be answered by processing a plurality of tables stored in one or more data sources. The question returns a first set of columns as answer. However, the question requires performing a join based on a second set of columns. The second set of columns ma include primary keys and foreign keys of tables. The analysis system retrieves only the second set of columns comprising primary/foreign keys from the one or more tables. The analysis system leaves the first set of columns in their respective data sources and does not fetch them. Accordingly, the first set of columns is never retrieved and stored in the analysis system. The analysis system 100 performs the join operation using only the second set of columns. The analysis system 100 does not retrieve the first set of columns since it may not comply with some policies/rules, e.g., not GDPR compliant. The analysis system 100 sends the result identifying the rows of the one or more tables to a client device. The client device may retrieve the first set of columns from the one or more data sources directly. As a result, the client device may obtain the full set of columns that represent the answer to the question but the analysis system 100 does not fetch the full set of columns. In particular, the analysis system does not fetch the first set of columns.

In an embodiment, the analysis system receives access to a staging system where the analysis system can store data temporarily for processing. The staging system represents a customer's bucket where data can be stored. As a result, the analysis system never receives any data that may be non-compliant. All data used by the analysis system for processing is stored in either the data sources of the data source, e.g., systems of the enterprise providing the data or in a staging area that is provided by the enterprise that requested the analysis. This includes data stored temporarily for processing.

Alternative Embodiments

In some embodiments, the analysis system allows selective data to be imported from a data source to perform processing and allows data to be exported to a data source. In an embodiment, the user interface used by a client device is an internet based browser that interacts with the analysis system using web protocols such as HTTP.

In some embodiments, the analysis system computes and stores entities or tables based on existing data. The analysis system determines lineage of each entity or table that exists in the system identifying the source from which the entity or table was obtained. The analysis system tracks the lineage for answers to a question, data of a data model, data of an entity, or data of a table. In an embodiment, the analysis system tracks the execution plan of questions to determine the source of data used for computing the values. The lineage of data allows the analysis system to determine quality of each data based on the quality of the sources used to obtain the data. The quality of the data may be indicative of how clean the data is in terms of nulls/format errors/data type issues and so on. The quality of the data may be indicative of a degree of compliance of the data, for example, compliance with privacy rules. In an embodiment, the analysis system determines a quality score for a data as a weighted aggregate of the quality score of the individual input data elements (e.g., tables, fields, and so on) used to compute the data.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
receiving information identifying a plurality of data sources;
for each of the plurality of data sources, retrieving metadata describing data stored in the data source;
receiving a natural language question;
identifying one or more phrases from the natural language question; and
for each of the one or more phrases:
identifying from the plurality of data sources, a plurality of data assets matching the phrase, each data asset determined to store data relevant for answering the question;
determining a score for each of the plurality of data assets, the score determined based on factors comprising, a degree of match between the phrase and metadata describing the data asset;
ranking the plurality of data assets based on their scores; and
sending for display via a client device, data describing at least a subset of the plurality of data assets, the subset determined based on the ranking.

2. The computer-implemented method of claim 1, wherein each of the one or more phrases is associated with an entity and the score for the data asset is based on a number of field names of the entity that match fields of the data asset.

3. The computer-implemented method of claim 2, wherein the score for the data asset is based on matching of data types of fields of the data asset and corresponding data types of fields of the entity.

4. The computer-implemented method of claim 1, wherein the score for the data asset is based on an amount of data stored in the data asset.

5. The computer-implemented method of claim 1, wherein the score for the data asset is based on a measure of data quality of data stored in the data asset, wherein the measure of data quality of data stored in the data asset is inversely related to a frequency of occurrence of nulls in fields of the data asset.

6. The computer-implemented method of claim 5, wherein the measure of data quality of data stored in the data asset is based on a frequency of occurrence of fields that fail to conform to a predetermined format.

7. The computer-implemented method of claim 5, wherein the measure of data quality of data stored in the data asset is inversely related to the frequency of occurrence of fields that fail to conform to a predetermined format.

8. A non-transitory computer-readable storage medium storing computer-executable instructions for executing on a computer processor, the instructions when executed by the computer processor cause the computer processor to perform steps comprising:
receiving information identifying a plurality of data sources;
for each of the plurality of data sources, retrieving metadata describing data stored in the data source;
receiving a natural language question;
identifying one or more phrases from the natural language question; and
for each of the one or more phrases:
identifying from the plurality of data sources, a plurality of data assets matching the phrase, each data asset determined to store data relevant for answering the question;
determining a score for each of the plurality of data assets, the score determined based on factors comprising, a degree of match between the phrase and metadata describing the data asset;
ranking the plurality of data assets based on their scores; and
sending for display via a client device, data describing at least a subset of the plurality of data assets, the subset determined based on the ranking.

9. The non-transitory computer-readable storage medium of claim 8, wherein each of the one or more phrases is associated with an entity and the score for the data asset is based on a number of field names of the entity that match fields of the data asset.

10. The non-transitory computer-readable storage medium of claim 9, wherein the score for the data asset is based on matching of data types of fields of the data asset and corresponding data types of fields of the entity.

11. The non-transitory computer-readable storage medium of claim 8, wherein the score for the data asset is based on an amount of data stored in the data asset.

12. The non-transitory computer-readable storage medium of claim 8, wherein the score for the data asset is based on a measure of data quality of data stored in the data asset, wherein the measure of data quality of data stored in the data asset is inversely related to a frequency of occurrence of nulls in fields of the data asset.

13. The non-transitory computer-readable storage medium of claim 12, wherein the measure of data quality of data stored in the data asset is based on a frequency of occurrence of fields that fail to conform to a predetermined format.

14. The non-transitory computer-readable storage medium of claim 12, wherein the measure of data quality of data stored in the data asset is inversely related to the frequency of occurrence of fields that fail to conform to a predetermined format.

15. A computer-implemented system comprising:
a computer processor; and
a non-transitory computer-readable storage medium storing computer-executable instructions for executing on a computer processor, the instructions when executed by the computer processor cause the computer processor to perform steps comprising:
   receiving information identifying a plurality of data sources;
   for each of the plurality of data sources, retrieving metadata describing data stored in the data source;
   receiving a natural language question;
   identifying one or more phrases from the natural language question; and
   for each of the one or more phrases:
      identifying from the plurality of data sources, a plurality of data assets matching the phrase, each data asset determined to store data relevant for answering the question;
      determining a score for each of the plurality of data assets, the score determined based on factors comprising, a degree of match between the phrase and metadata describing the data asset;
   ranking the plurality of data assets based on their scores; and
   sending for display via a client device, data describing at least a subset of the plurality of data assets, the subset determined based on the ranking.

16. The computer-implemented system of claim 15, wherein each of the one or more phrases is associated with an entity and the score for the data asset is based on a number of field names of the entity that match fields of the data asset.

17. The computer-implemented system of claim 16, wherein the score for the data asset is based on matching of data types of fields of the data asset and corresponding data types of fields of the entity.

18. The computer-implemented system of claim 15, wherein the score for the data asset is based on an amount of data stored in the data asset.

19. The computer-implemented system of claim 15, wherein the score for the data asset is based on a measure of data quality of data stored in the data asset, wherein the measure of data quality of data stored in the data asset is inversely related to a frequency of occurrence of nulls in fields of the data asset.

20. The computer-implemented system of claim 19, wherein the measure of data quality of data stored in the data asset is based on a frequency of occurrence of fields that fail to conform to a predetermined format.

* * * * *